United States Patent
Hansen

(10) Patent No.: US 11,905,927 B2
(45) Date of Patent: Feb. 20, 2024

(54) FREQUENCY CONTENT BASED MONITORING OF WIND TURBINE BLADE PITCH SYSTEM

(71) Applicant: Vestas Wind Systems A/S, Aarhus N (DK)

(72) Inventor: Frank Møller Hansen, Arden (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/914,900

(22) PCT Filed: Apr. 12, 2021

(86) PCT No.: PCT/DK2021/050100
§ 371 (c)(1),
(2) Date: Sep. 27, 2022

(87) PCT Pub. No.: WO2021/219175
PCT Pub. Date: Nov. 4, 2021

(65) Prior Publication Data
US 2023/0129895 A1    Apr. 27, 2023

(30) Foreign Application Priority Data

Apr. 30, 2020    (DK) ........................... PA 2020 70272

(51) Int. Cl.
*B63H 1/00*     (2006.01)
*F03D 17/00*    (2016.01)
*F03D 7/02*     (2006.01)

(52) U.S. Cl.
CPC ........... *F03D 17/00* (2016.05); *F03D 7/0224* (2013.01); *F05B 2270/328* (2013.01); *F05B 2270/331* (2013.01)

(58) Field of Classification Search
CPC ....... Y02E 10/72; F03D 7/0224; F03D 17/00; F05B 2270/328; F05B 2260/80
(Continued)

(56) References Cited

U.S. PATENT DOCUMENTS 11,539,317 B2 *  12/2022  Mukherjee ............ H02P 29/032
2017/0328349 A1 *  11/2017  Pan ......................... F03D 80/70
(Continued)

FOREIGN PATENT DOCUMENTS

DE       102011086608 A1     7/2012

OTHER PUBLICATIONS

Danish Patent and Trademark Office, Search and Examination Report in PA 2020 70272, dated Oct. 20, 2020.
(Continued)

*Primary Examiner* — Long T Tran
*Assistant Examiner* — James J Kim

(57) ABSTRACT

Systems, methods, and computer program products for monitoring a wind turbine (10). The system receives a signal (426) indicative of a pitch force being applied to a blade (20) of a wind turbine (10). The signal (426) is sampled to generate a discrete time-domain signal (426) including a plurality of pitch force samples. Samples are selected for analysis using a sampling window (326) that excludes samples obtained under operating conditions determined to be detrimental to obtaining good data. The selected samples are processed to generate a spectral density (150) of the signal (426), and the frequency content of the spectral density (150) analysed to determine the condition of one or more components of the wind turbine (10). If the analysis indicates that a component of the wind turbine (10) needs attention, the system generates an alarm.

14 Claims, 18 Drawing Sheets

(58) Field of Classification Search
USPC .......................................................... 416/61
See application file for complete search history.

(56) References Cited

U.S. PATENT DOCUMENTS

| | | |
|---|---|---|
| 2018/0347549 A1 | 12/2018 | Huot et al. |
| 2019/0063404 A1* | 2/2019 | Baba ....................... F03D 7/024 |
| 2019/0178231 A1* | 6/2019 | Tomas ....................... F03D 7/02 |
| 2019/0211805 A1 | 7/2019 | Elmose et al. |
| 2019/0219032 A1* | 7/2019 | He ........................ G01M 13/04 |

OTHER PUBLICATIONS

European Patent Office, International Search Report and Written Opinion in PCT Application No. PCT/DK2021/050100, dated Jun. 23, 2021.

* cited by examiner

FREQUENCY CONTENT BASED MONITORING OF WIND TURBINE BLADE PITCH SYSTEM

BACKGROUND

This invention generally relates to monitoring a wind turbine and, in particular, to methods, systems, and computer program products for determining the condition of a wind turbine based on the spectral density of signals generated by blade pitch drive systems.

Wind turbines are a growing source of electricity primarily due to their low carbon footprint and concerns over the impact of traditional methods of generating electricity on the environment.

However, in order to accelerate the replacement of plants that rely on fossil fuels with wind turbines, and to remain competitive with other forms of renewable energy, it is important to continue to reduce the cost of providing electricity with wind turbines. One source of costs with wind turbines is maintaining the turbines. Maintenance must be frequent enough to prevent power disruptions due to component failure but should not be unnecessarily frequent due to the cost of sending a crew to perform inspections. Maintenance of wind turbines is particularly expensive due to many factors, such as the remote nature of many wind farms, the necessity to disrupt the production of electricity while maintenance is performed, and the fact that the turbines are typically on top of tall towers, and thus difficult to reach.

One way of monitoring operation of a wind turbine is to place vibration sensors on or near components that tend to wear out. The need for maintenance is then determined by analysing vibrations received by the sensor to determine if vibrations characteristic of a worn or failing component are present. However, these types of systems add cost and complexity to the wind turbine due to the need for additional sensors, which themselves become potential points of failure. In addition, the sources of noise in wind turbines can be difficult to isolate, which often leads to misdiagnosis of problems and unnecessary maintenance. In particular, operating conditions often affect vibration data, thereby making it difficult to separate noises being generated in different locations in the wind turbine.

Thus, there is a need for improved systems, methods, and computer program products which enable the detection of vibrations in wind turbines and diagnosis of component condition based on the detected vibrations.

SUMMARY OF INVENTION

In an embodiment of the invention, a system for monitoring operation of a wind turbine including a rotor having a blade is provided. The system includes one or more processors, and a memory coupled to the one or more processors. The memory includes program code that, when executed by the one or more processors, causes the system to receive a time-domain signal indicative of a pitch force being applied to the blade, determine a first spectral density of the time-domain signal, determine a condition of the wind turbine based on a frequency content of the first spectral density, and in response to the condition being indicative of a problem with the wind turbine, generate an alarm signal.

In an aspect of the invention, the time-domain signal is indicative of a pressure of a fluid in a chamber of a hydraulic actuator of a pitch drive that controls a pitch of the blade.

In another aspect of the invention, the program code causes the system to determine the first spectral density by sampling the time-domain signal to generate a discrete time-domain signal, selecting a plurality of samples from the discrete time-domain signal that are within a sampling window, and transforming the plurality of samples from a time-domain to a frequency-domain.

In another aspect of the invention, the rotor rotates in a rotor plane having a plurality of sectors, and the sampling window corresponds to a first period of time when the blade is in a selected sector of the plurality of sectors.

In another aspect of the invention, the blade passes through a horizontal position while the blade moves through the selected sector.

In another aspect of the invention, the plurality of samples is selected so that each sample of the plurality of samples corresponds to a wind speed that is within a predetermined wind speed range or a rate of change in the wind speed that is within a predetermined rate of change in wind speed range.

In another aspect of the invention, the samples are selected so that each sample of the plurality of samples corresponds to a pitch position that is within a predetermined pitch position range or a rate of change in the pitch position that is within a predetermined rate of change in pitch position range.

In another aspect of the invention, the samples are selected so that each sample of the plurality of samples corresponds to a power output of the wind turbine that is within a predetermined power output range or a rate of change in the power output of the wind turbine that is within a predetermined rate of change in power output range.

In another aspect of the invention, the rotor rotates in the rotor plane having the plurality of sectors, the sampling window is one of at least two sampling windows, the samples are selected so that each sample of the plurality of samples is in each sampling window of the at least two sampling windows, and the at least two sampling windows are selected from a first sampling window corresponding to a first period of time when the blade is in a selected sector of the plurality of sectors, a second sampling window corresponding to a wind speed that is within a predetermined wind speed range or a rate of change in the wind speed that is within a predetermined rate of change in wind speed range, a third sampling window corresponding to a pitch position that is within a predetermined pitch position range or a rate of change in the pitch position that is within a predetermined rate of change in pitch position range, and a fourth sampling window corresponding to a power output of the wind turbine that is within a predetermined power output range or a rate of change in the power output of the wind turbine that is within a predetermined rate of change in power output range.

In another aspect of the invention, the samples are selected so that each sample of the plurality of samples corresponds to a load on the blade that is within a predetermined load range.

In another aspect of the invention, the program code causes the system to determine the condition of the wind turbine based on the frequency content of the first spectral density by comparing the first spectral density to a second spectral density determined for the wind turbine during a second period of time when the wind turbine is known to have been operating normally.

In another aspect of the invention, the program code causes the system to determine the condition of the wind turbine based on the first spectral density by defining at least one frequency bin covering a portion of the first spectral density, determining one or more of a maximum amplitude, a mean amplitude, and a minimum amplitude of the portion of the first spectral density covered by the at least one frequency bin, comparing the one or more of the maximum amplitude, the mean amplitude, and the minimum amplitude of the portion of the first spectral density to a respective alarm threshold, and triggering an alarm if the one or more of the maximum amplitude, the mean amplitude, and the minimum amplitude exceeds its respective alarm threshold.

In another aspect of the invention, the at least one frequency bin is one of a plurality of frequency bins each covering a different portion of the first spectral density, and the determining, comparing, and triggering steps are performed for each of the plurality of frequency bins.

In another aspect of the invention, the program code causes the system to determine the condition of the wind turbine based on the first spectral density by defining at least one working-point having a frequency corresponding to a harmonic of a rotation of the rotor, determining one or more of a maximum amplitude, a mean amplitude, and a minimum amplitude for the at least one working-point, comparing the one or more of the maximum amplitude, the mean amplitude, and the minimum amplitude for the at least one working-point to a respective alarm threshold, and triggering an alarm if the one or more of the maximum amplitude, the mean amplitude, and the minimum amplitude of the at least one working-point exceeds the alarm threshold.

In another aspect of the invention, the at least one working-point is one of a plurality of working-points each corresponding to a different harmonic of the rotation of the rotor, and the determining, comparing, and triggering steps are performed for each of the plurality of working-points.

In another aspect of the invention, the program code further causes the system to, in response to the first spectral density including a frequency component having an amplitude above a resonance threshold, activate a resonance control algorithm that dampens resonances corresponding to the frequency component.

In another embodiment of the invention, a method for monitoring operation of the wind turbine including the rotor having the blade is presented. The method includes receiving the time-domain signal indicative of the pitch force being applied to the blade, determining the first spectral density of the time-domain signal, determining the condition of the wind turbine based on the frequency content of the first spectral density, and, in response to the condition being indicative of a problem with the wind turbine, generating an alarm signal.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

It should be understood that the appended drawings are not necessarily to scale, and may present a somewhat simplified representation of various features illustrative of the basic principles of the invention. The specific design features of the sequence of operations as disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding. In particular, thin features may be thickened, for example, for clarity or illustration.

DETAILED DESCRIPTION OF THE INVENTION

Embodiments of the invention determine a condition of a wind turbine based on an amount of force exerted on one or more blades of the wind turbine to control the pitch of the blades. To this end, a time-domain signal indicative of the pitch force being applied to a blade of the wind turbine is received by a monitoring system. This signal may be directly related to the pitch force (e.g., a signal output by a strain gauge measuring the force being applied to the blade by a pitch drive), or may be indirectly related to the pitch force (e.g., a signal output by a pressure sensor measuring the pressure in a hydraulic actuator of the pitch drive). In either case, it has been determined that the frequency content of these types of signals can provide information on the operation of the wind turbine.

A spectral density of the time-domain signal may be obtained by converting the time-domain signal to a frequency-domain signal. The condition of the wind turbine or one or more components of the wind turbine may then be determined based on the spectral density. A sampling window may be applied to the signal in the time-domain that selects which portions of the signal are to be analyzed. Selectively filtering samples in the time-domain based on various operating parameters has been determined to improve the ability of the monitoring system to detect certain conditions of the wind turbine, such as worn bearings or other components which need to be serviced.

Figure 1:
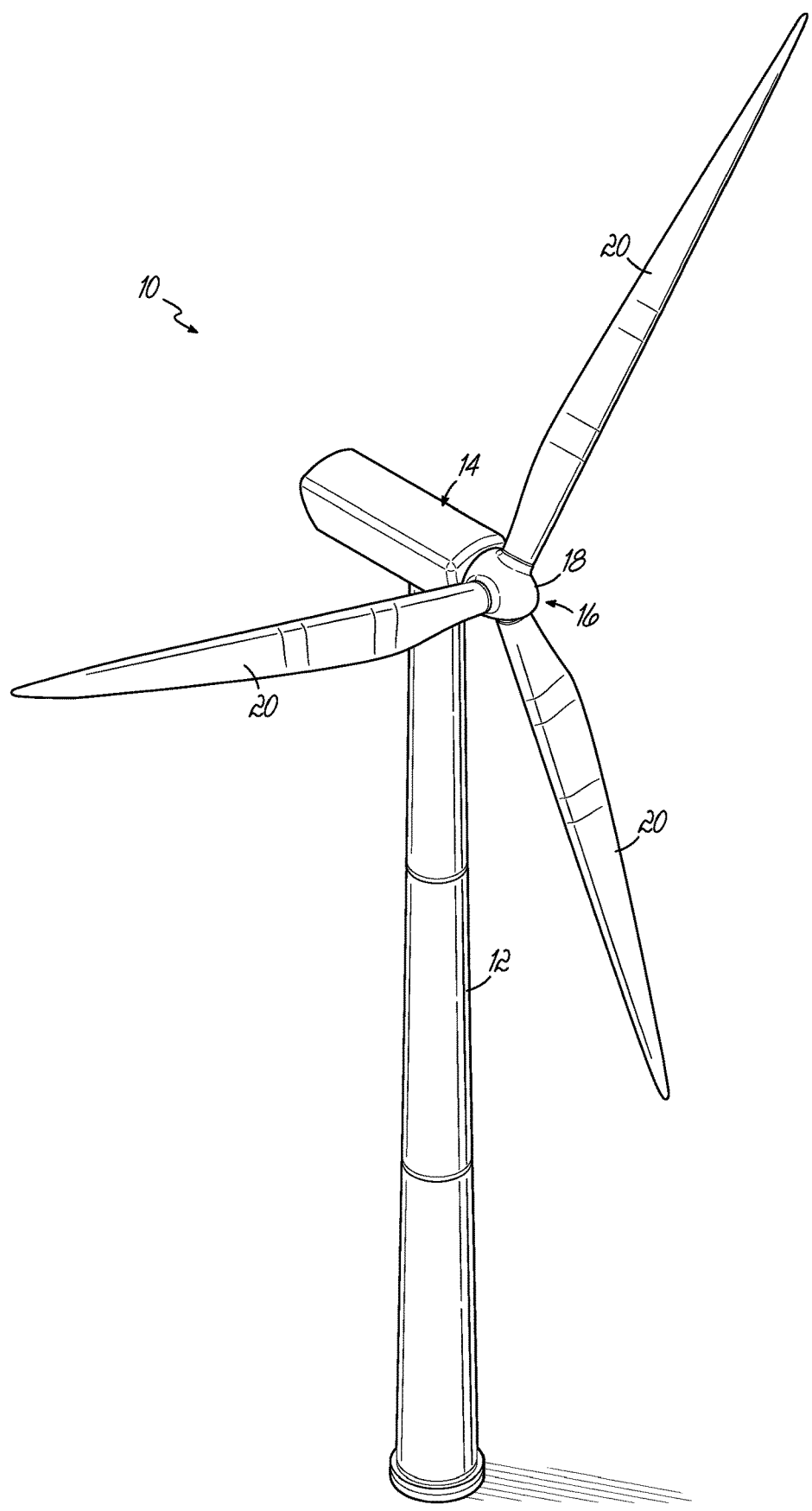
FIG. 1 is a perspective view of an exemplary wind turbine in accordance with an embodiment of the invention including a nacelle and a rotor.

FIG. 1 illustrates an exemplary wind turbine 10 in accordance with an embodiment of the invention. The wind turbine 10 includes a tower 12, a nacelle 14 disposed at the apex of the tower 12, and a rotor 16 operatively coupled to a generator in the nacelle 14. In addition to the generator, the nacelle 14 typically houses various components needed to convert wind energy into electrical energy and needed to operate and optimize the performance of the wind turbine 10. The tower 12 supports the load presented by the nacelle 14, rotor 16, and other wind turbine components housed inside the nacelle 14. The tower 12 of wind turbine 10 elevates the nacelle 14 and rotor 16 to a height above ground level that allows the rotor 16 to spin freely and at which air currents having lower turbulence and higher velocity are often found.

The rotor 16 includes a hub 18 and one or more (e.g., three) blades 20 attached to the hub 18 at locations distributed about the circumference of the hub 18. The blades 20 project radially outward from the hub 18, and are configured to interact with passing air currents to produce rotational forces that cause the hub 18 to spin about its longitudinal axis. This rotational energy is delivered to the generator housed within the nacelle 14 and converted into electrical power. To optimize performance of the wind turbine 10, the pitch of blades 20 is adjusted by a pitch system in response to wind speed and other operational conditions.

Figure 2:
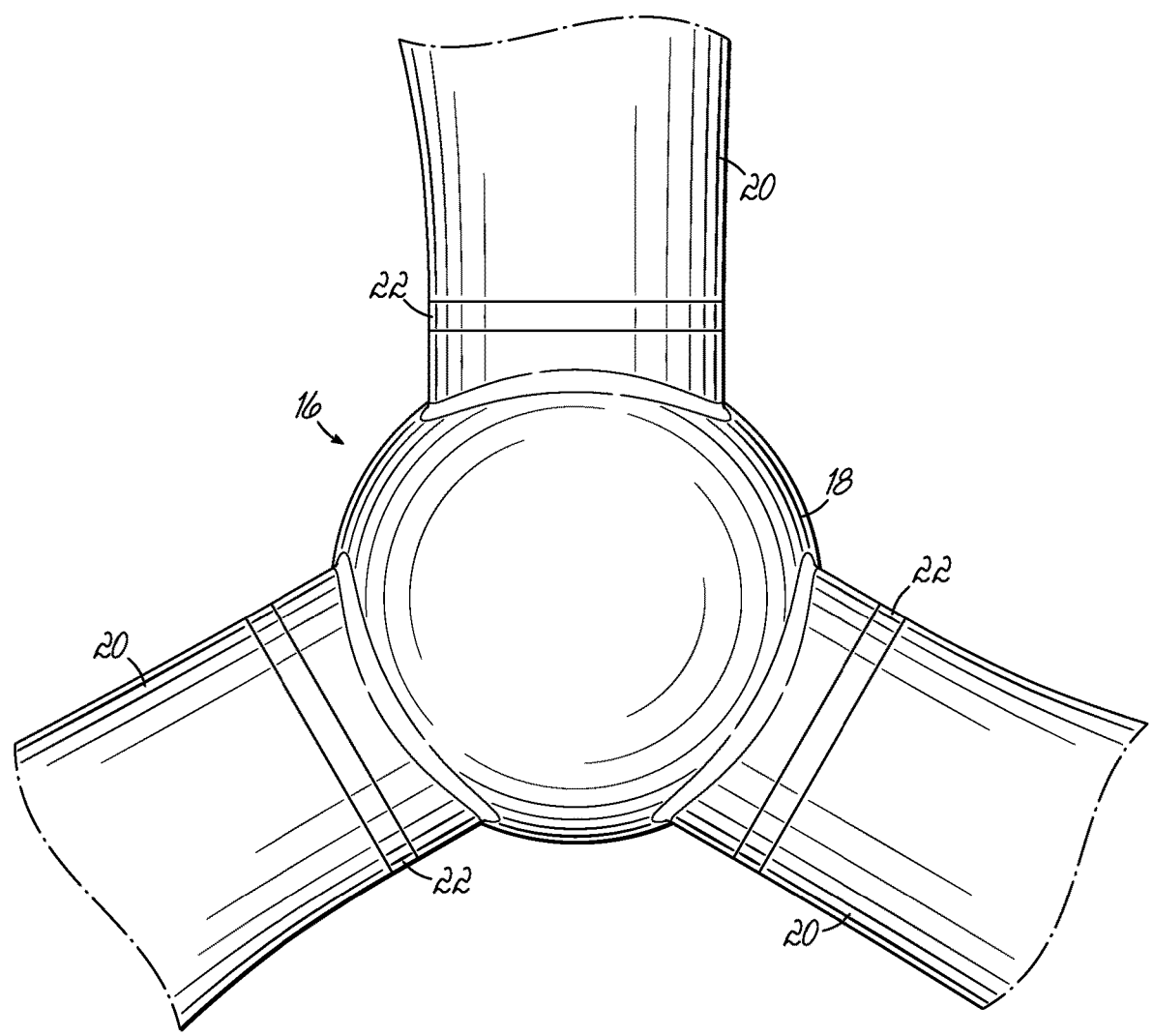
FIG. 2 is a front view of a portion of the rotor of FIG. 1 showing blades attached to a hub of the rotor by pitch bearings.

FIG. 2 is a front-view of the rotor 16 of wind turbine 10 showing pitch bearings 22 that operatively couple the blades 20 to the hub 18. Each pitch bearing 22 has an axis of rotation that is generally aligned with a longitudinal axis of the blade 20. The pitch bearings 22 are configured so that each blade 20 can be rotated relative to the hub 16 around the bearing's axis of rotation, and to transfer forces between the hub 18 and the blades 20. These forces include those induced by gravity, centrifugal force, wind loading, and the load presented by the generator.

The direction the gravitational force acts on a pitch bearing 22 varies depending on the position of the blade 20, and thus produces a varying load 22 that tends to repeat over each rotation of the rotor 16. When the rotor 16 is rotating, the bearings 22 are also subjected to centrifugal force, which mainly produces an axial pull in the pitch bearings 22. The forces produced by wind loading include forces that cause the rotor 16 to rotate, and typically produce the greatest load on the pitch bearing 22. The pitch bearing 22 is configured to transfer these loads to the hub 18, which in turn transfers these loads to the rest of the wind turbine 10.

Changing the pitch of a blade 20 generally changes the amount of lift and drag generated by the blade 20 in response to the wind, which changes the driving force provided to the hub 18 by the blade 20 and lateral forces that are transferred to the tower 12. Thus, pitch systems can be used to help control the wind turbine 10, optimize power production under varying wind conditions, and prevent damage from excessive amounts of wind.

Figure 3:
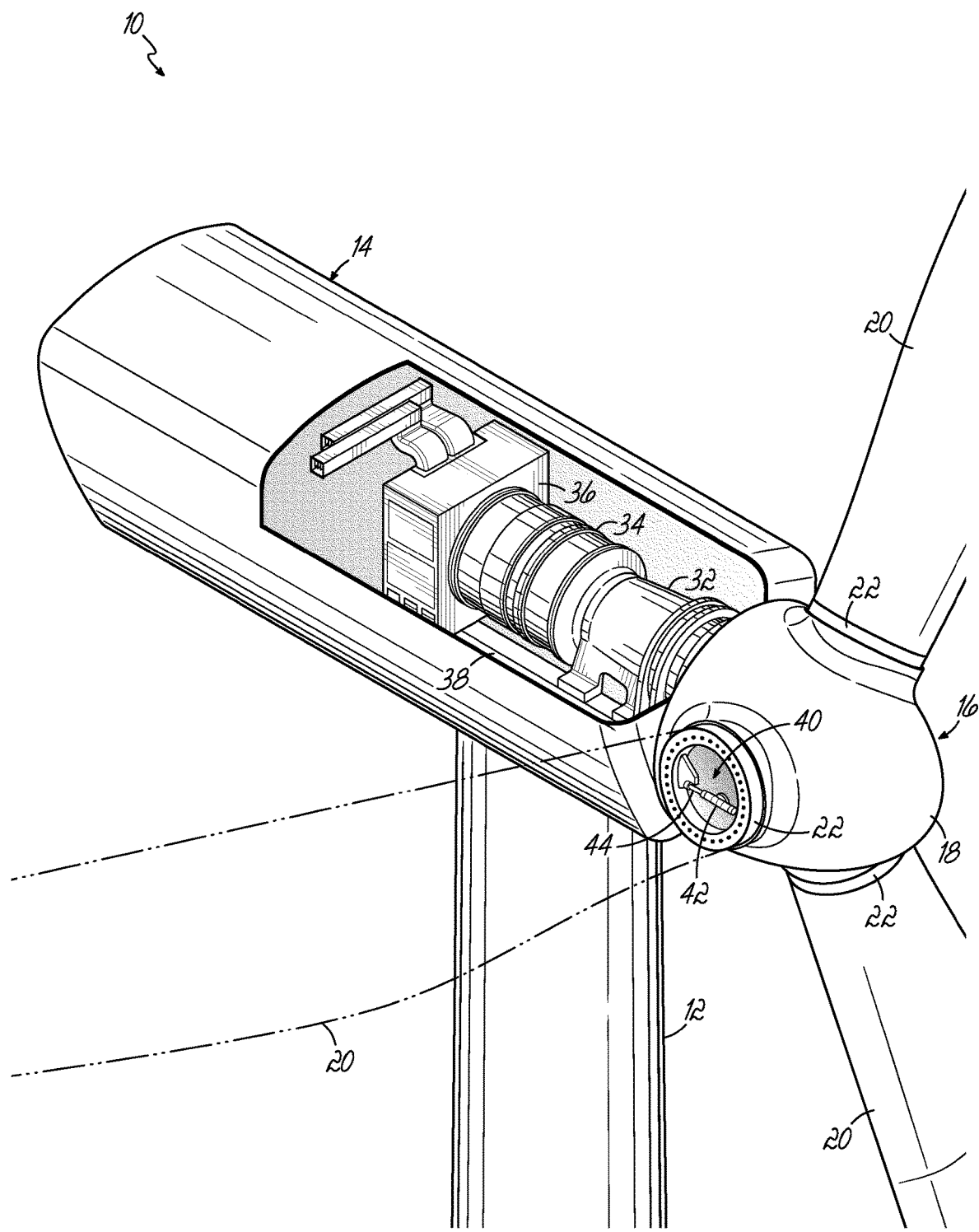
FIG. 3 is a perspective view of a portion of the wind turbine of FIG. 1 in which the nacelle is partially broken away to expose structures housed inside the nacelle.

FIG. 3 presents a perspective view in which the nacelle 14 is partially broken away to expose structures housed inside. A main shaft extending from the rotor 16 into the nacelle 14 may be held in place by a main bearing support 32 which supports the weight of the rotor 16 and transfers the loads on the rotor 16 to the tower 12. The main shaft may be operatively coupled to a gearbox 34 that transfers the rotation thereof to a generator 36. The electrical power produced by the generator 36 may be supplied to a power grid (not shown) or an energy storage system (not shown) for later release to the grid as understood by a person having ordinary skill in the art. In this way, the kinetic energy of the wind may be harnessed by the wind turbine 10 for power generation. The nacelle 14 may also house other equipment (not shown) used to operate the wind turbine 10, such as hydraulic pumps, hydraulic accumulators, cooling systems, controllers, sensors, batteries, communication equipment, etc.

The weight of the nacelle 14 including the components housed therein may be carried by a load bearing structure 38. The load bearing structure 38 may include an outer housing of the nacelle 14 and one or more additional structural components such as a framework or lattice, and a gear bell which through a yaw bearing (not shown) operatively couples the load of the nacelle 14 to the tower 12. The yaw bearing may be configured to allow the nacelle 14 to be rotated into or out of the wind by a yaw system. The hub 18 may house at least a portion of a pitch system that includes one or more pitch drives 40. Each pitch drive 40 may include one or more pitch actuators 42 (e.g., a hydraulic cylinder, electrical actuator, mechanical actuator, etc.) configured to provide a pitch force and that is operatively coupled to a respective blade 20 of rotor 16 by a linkage 44.

Figure 4:
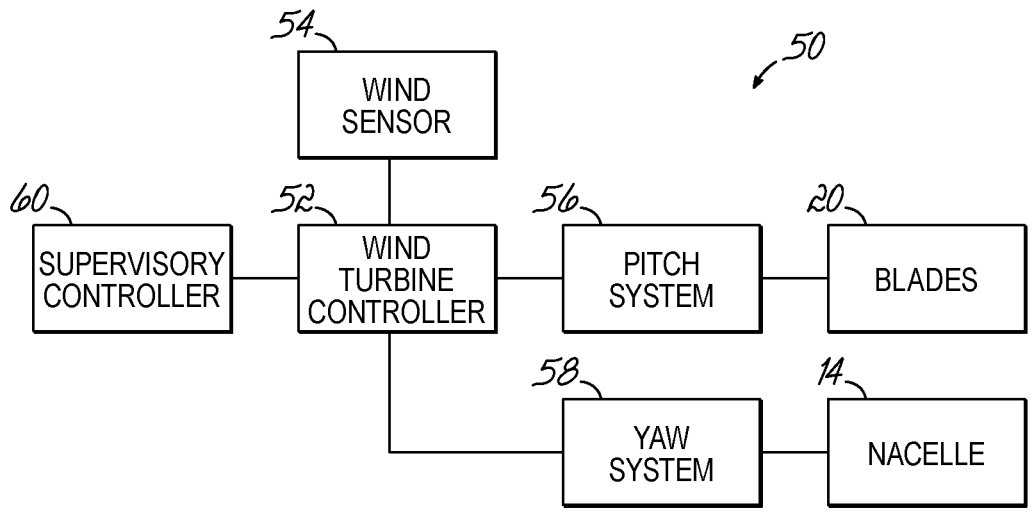
FIG. 4 is a diagrammatic view of a control system including a pitch system that may be used to control the pitch of blades in the wind turbine of FIGS. 1-3.

FIG. 4 illustrates an exemplary control system 50 that may be used to control the wind turbine 10. The control system 50 includes a wind turbine controller 52 in communication with a wind sensor 54, a pitch system 56, a yaw system 58, and a supervisory controller 60. The supervisory controller 60 may be configured to implement a system-wide control strategy for a group of wind turbines 10 (e.g., a wind farm) that optimizes the collective performance of the wind turbines 10, e.g., to maximize power production of the group and minimize overall maintenance. The yaw system 58 may be used by the wind turbine controller 52 to control the direction in which the nacelle 14 is pointed, and may include one or more yaw controllers, drive systems, position sensors, etc. configured to implement a yaw command signal received from the wind turbine controller 52. The pitch system 56 may be configured to adjust the pitch of the blades 20 collectively or independently in response to a pitch command signal received from the wind turbine controller 52. The mechanical force, or "pitch force", necessary to pitch the blades 20 may be provided by the pitch drive 42.

Figure 5:
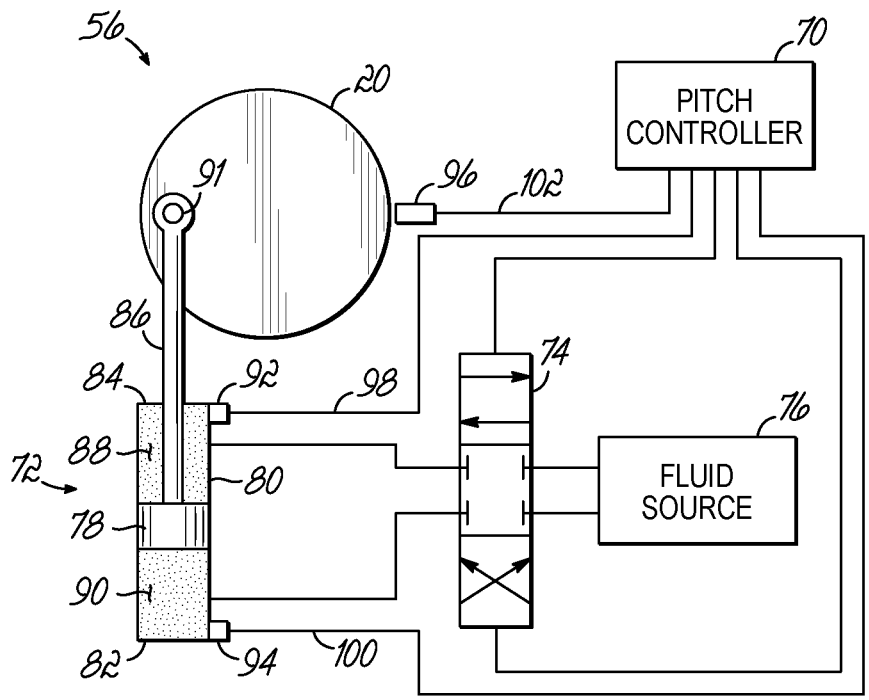
FIG. 5 is a diagrammatic view of the pitch system of FIG. 4 according to an exemplary embodiment of the invention.

FIG. 5 illustrates an exemplary pitch system 56 that includes a pitch controller 70, a hydraulic actuator 72, and a hydraulic valve 74 (e.g., a proportional valve) that couples the hydraulic actuator 72 to a source 76 of pressurized hydraulic fluid. The pitch controller 70 may be an independent controller configured to control the pitch of one or more blades 20 of the wind turbine 10, or may be provided by another controller, such as the wind turbine controller 52.

The hydraulic actuator 72 includes a piston 78 located within a cylinder 80 that is terminated on one end by a cylinder cap 82 and on the other end by a cylinder head 84. The piston 78 is coupled to a piston rod 86 and divides the interior of the cylinder 80 into a front chamber 88 (also known as a piston rod chamber) through which the piston rod 86 passes, and rear chamber 90 (also known as a bottom chamber) that is terminated by the cylinder cap 82.

The piston rod 86 passes through a sealed opening in the cylinder head 84 and includes a distal end operatively coupled to the blade 20 by a linkage 91. The linkage may include a ball joint, pivot joint, or other joint that allows rotation between the distal end of the piston rod 86 and the blade 20 about at least one axis. Movement of the piston rod 86 may thereby cause the blade 20 to rotate about a longitudinal axis of the pitch bearing 22. The cylinder cap 82 may be operatively coupled to the hub 18 of rotor 16 (e.g., by another joint that allows rotation) so that movement of the piston 78 causes an angular displacement of the blade 20 relative to the hub 18. The pitch controller 70 thereby causes the piston 78 to apply a pitch force to the piston rod 86 in a forward direction (toward the cylinder head 84) or in a rearward direction (toward the cylinder cap 82) in response to activation of the hydraulic valve 74.

In response to receiving a signal from the pitch controller 70, the hydraulic valve 74 may selectively fluidically couple an output port of the fluid source 76 to one of the front chamber 82 and rear chamber 90 of hydraulic actuator 72, and selectively fluidically couple a return port of the fluid source to the other of the front chamber 82 and rear chamber of hydraulic actuator 72.

The pitch controller 70 may thereby control the flow of fluid between the fluid source 76 and the hydraulic actuator 72 via actuation of the hydraulic valve 74. The fluid source 76 may include one or more pumps, valves, accumulators, etc. configured to provide pressurized fluid. The fluid source 76 may be dedicated to operation of a single hydraulic actuator 72, or may provide fluid to multiple hydraulic actuators 72 controlled by the pitch system 56.

The pitch system 56 may further include one or more of a front chamber pressure sensor 92, a rear chamber pressure sensor 94, and a position sensor 96. The front chamber pressure sensor 92 is configured to sense the pressure of the fluid in, or that is being provided to, the front chamber 82 of hydraulic actuator 72. The rear chamber pressure sensor 94 is configured to sense the pressure in, or that is being provided to, the rear chamber 86 of hydraulic actuator 72. Each pressure sensor 92, 94 may output a respective pressure signal 98, 100 indicative of the pressure sensed by the sensor. For example, each signal 98, 100 may have one or more characteristics (e.g., a voltage, current, impedance, frequency, phase, etc.) that provide information to the pitch controller 70 indicative of the sensed pressure.

The pitch position sensor 96 may be configured to provide a pitch position signal 102 to the pitch controller 70 indicative of the pitch position ϕ of the blade 20 in a similar manner as described above with respect to the pressure sensors 92, 94. By way of example, the pitch position sensor 96 may be configured to measure the angular position of the blade 20 using one or more sensors, such as optical sensors, magnetic sensors or mechanical sensors, which may be used to generate signals indicative of the pitch position ϕ of the blade 20 to the pitch controller 70. The pitch controller 70 may use the pressure data received from the pressure sensors 92, 94 to determine a pitch force being applied to the blade 20 by the hydraulic actuator 72. The pitch force may be determined, for example, using the following equation:

$$F_P = P_{FC} \times A_{FF} - P_{RC} \times A_{RF} \tag{Eqn.1}$$

where $F_P$ is the pitch force applied by the piston rod 86, $P_{FC}$ is the pressure in the front chamber 88, $P_{RC}$ is the pressure in the rear chamber 90, $A_{FF}$ is the effective area of the piston 78 facing the front chamber 88, and $A_{RF}$ is the effective area of the piston 78 facing the rear chamber 90. As can be seen from Equation 1, a positive value of pitch force $F_P$ indicates the piston rod 86 is pushing on the blade 20, and a negative value of force pitch force $F_P$ indicates the piston rod 86 is pulling on the blade 20. The effective area of the piston 78 facing the rear chamber 90 is typically larger than the effective area of the piston 90 facing the front chamber 88 due to the presence of the piston rod 86. Thus, under certain operating conditions (e.g., when the piston 78 is not moving), the pressure of the fluid in the front chamber 88 may tend to be higher than the pressure of the fluid in the rear chamber 90. In some cases, a force sensor (not shown) may be used to measure the pitch force $F_P$ directly. In this case, the pitch force $F_P$ can be determined without pressure measurements, or the force may be calculated based on pressure measurements merely to check operation of the force sensor.

Figure 6:
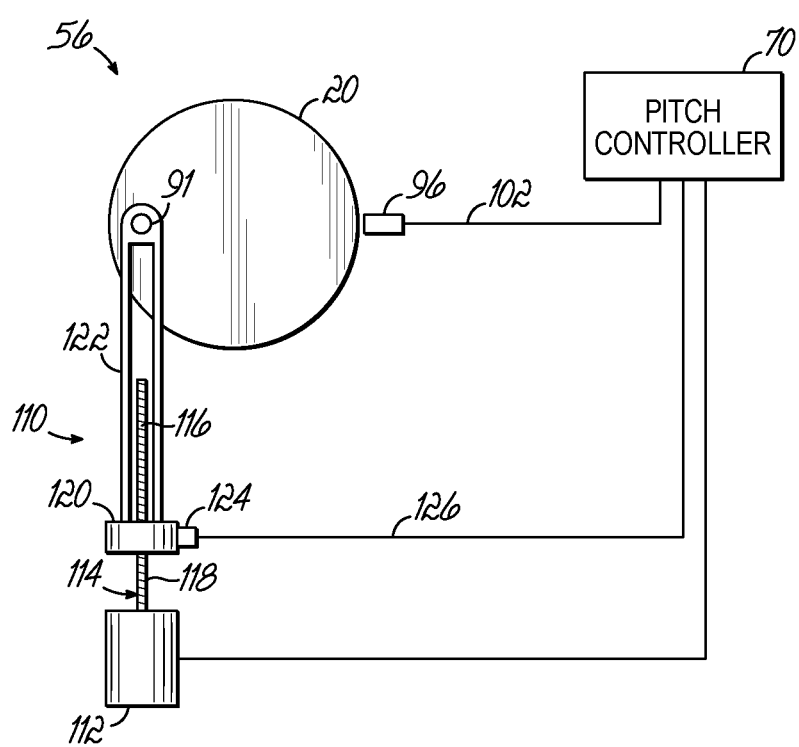
FIG. 6 is a diagrammatic view of the pitch system of FIG. 4 according to another exemplary embodiment of the invention.
Figure 7:
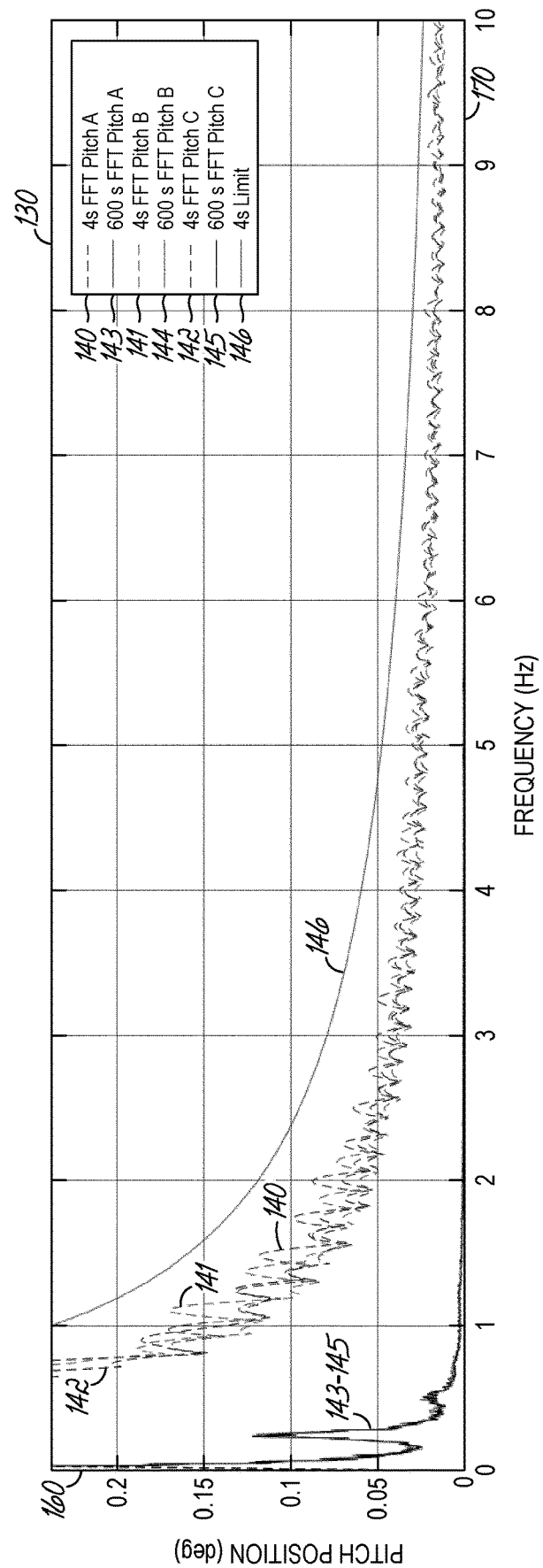
FIG. 7 is a graphical view illustrating the spectral density of signals indicative of the pitch position of each blade of the wind turbine of FIG. 1 determined using sampling windows having different lengths.
Figure 8:
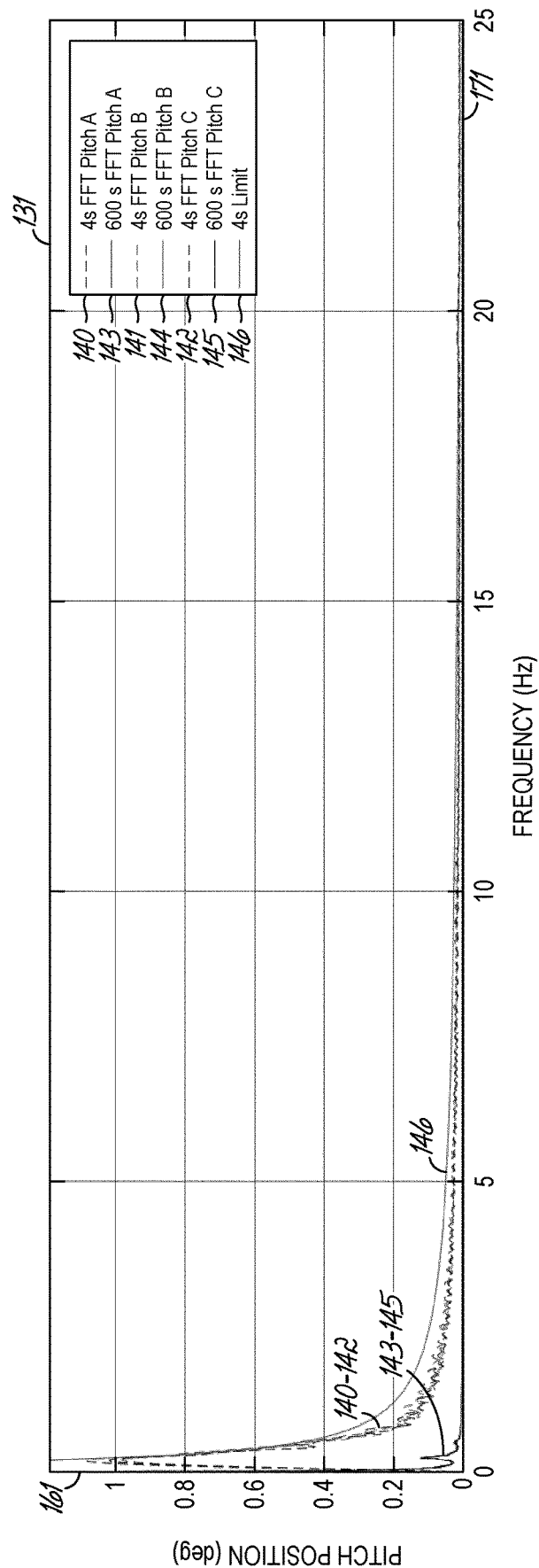
FIG. 8 is a graphical view illustrating the spectral density of signals indicative of the pitch position of each blade from FIG. 7 depicted using a different frequency scale.
Figure 9:
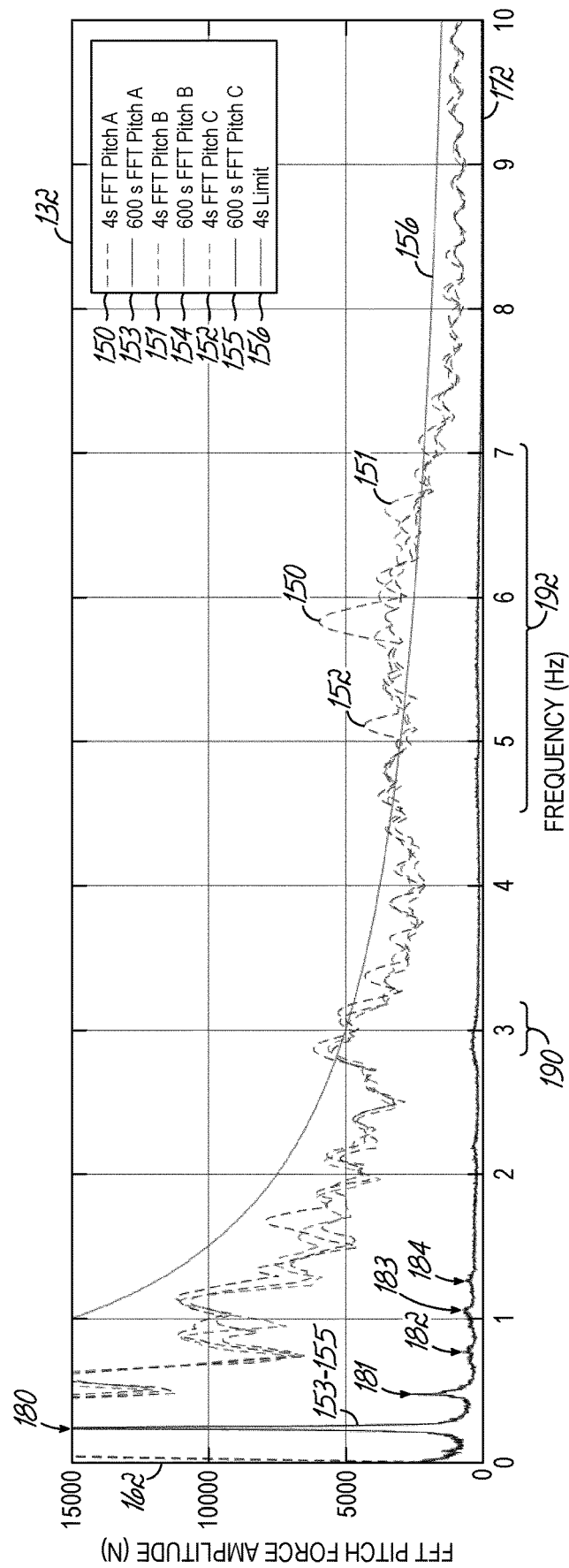
FIG. 9 is a graphical view illustrating the spectral density of signals indicative of the pitch force being applied to each blade of the wind turbine of FIG. 1 determined using sampling windows having different lengths.
Figure 10:
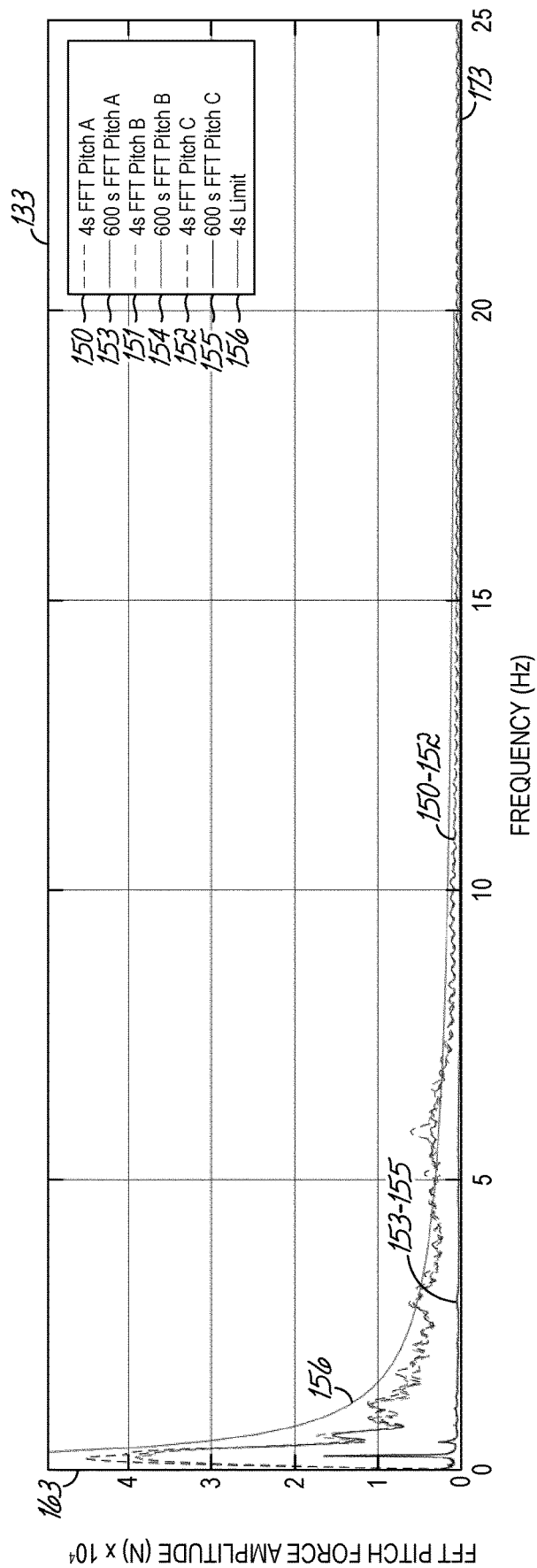
FIG. 10 is a graphical view illustrating the spectral density of signals indicative of the pitch force being applied to each blade from FIG. 9 depicted using a different frequency scale.

FIG. 6 illustrates an exemplary pitch system 56 in accordance with an alternative embodiment of the invention that utilizes a mechanical actuator 110 comprising a motor 112 (e.g., an electric or hydraulic motor) operatively coupled to a screw 114 that provides pitch force to the blade 20.

The screw 114 may include a cylindrical shaft 116 having a helical ridge 118 and a threaded collar 120 including a hole having a helical grove configured to mesh with the helical ridge 118 of cylindrical shaft 116. The screw 114 may be configured so that when the motor 112 rotates the cylindrical shaft 116, the collar 120 is urged longitudinally along an axis of the cylindrical shaft 116 in a direction dependent on the direction of rotation.

The collar 120 may be coupled to the linkage 91 by a connecting rod 122 so that the pitch force generated by the screw 114 is operatively coupled to the blade 20, i.e., so that movement of the collar 120 alters the pitch of the blade 20. The pitch system 56 may also include a force sensor 124 (e.g., a stress gauge) that provides a signal 126 to the pitch controller 70 indicative of the pitch force $F_P$ being applied to the blade 20 by the mechanical actuator 110.

It should be understood that, although the pitch system 56 has been generally described with reference to a pitch drive 40 including a single pitch actuator 42 per blade, the invention is not so limited. Embodiments of the invention may include pitch systems 56 having more than one pitch actuator per blade, as well as pitch actuators that rotate the blade 20 relative to the hub 18 in one or more axes of rotation.

One or more of the wind turbine controller 52, supervisory controller 60, pitch controller 70, or other suitable computing system may be configured to execute a wind turbine monitoring process that collects and analyzes at least one time-domain signal indicative of pitch force.

Signals indicative of pitch force may include signals directly related to pitch force (e.g., that are provided by a force sensor), signals indirectly related to pitch force, such as an amount of energy provided to a pitch actuator (e.g., that are provided by torque, current, voltage, or pressure sensors), or any other signal having a value that is correlated to pitch force. The pitch monitoring process may sample one or more time-domain signals indicative of pitch force and store the sampled values, or "samples" in memory as a discrete time-domain signal suitable for analysis. For example, pressure from one or more pitch actuators 42 of pitch system 56 may be sampled at regular intervals, e.g., with a sampling frequency $f_S$ above the Nyquist limit of any subsequent spectral analysis. A typical sampling frequency $f_S$ may have a frequency greater than or equal to 50 Hz, which would potentially allow for analysis of spectral content up to at least 25 Hz.

Samples indicative of pitch force, or "pitch force samples" may be stored in memory local to the wind turbine 10 producing the data, and may also be uploaded to a central database for analysis. The pitch monitoring process may thereby enable measurement of time varying characteristics of one or more signals indicative of pitch force. These characteristics may include the spectral content associated with one or more pitch axes and pitch actuators. By way of example, the pressure in a chamber of a hydraulic cylinder of a blade of the wind turbine 10 may be sampled and stored.

The spectral density of a signal indicative of pitch force may be analyzed over a predetermined band, such as between 0.2 Hz to 20 Hz. The term "spectral density" as used herein refers to the relationship between amplitude and frequency of signals in the frequency-domain, i.e., the power or energy distribution of the signal with respect to frequency. The amplitude of this frequency-domain signal may correspond to an amount of power or energy in the signal at the frequency in question, or in a frequency range centered on the frequency in question.

Other operational parameters of the wind turbine 10 may also be measured, sampled, and stored. As described in more detail below, these operational parameters may be indexed to the pitch force samples and used to determine which pitch force samples are selected for analysis and which pitch force samples are excluded from analysis, e.g., ignored or discarded.

FIGS. 7-10 depict graphs 130-133 including plots 140-146, 150-156 of exemplary amplitude verses frequency for pitch position ϕ (graphs 130 and 131) and pitch force $F_P$ (graphs 132 and 134) for each of three blades 20 of a wind turbine 10 subject to a wind speed V of about 18-20 meters/second (m/s) and having a generating capacity of about 2.2 Mega-watts (MW). Each graph 130-133 includes a respective vertical axis 160-163 corresponding to amplitude, and a horizontal axis 170-173 corresponding to frequency. The vertical axes 160, 161 of graphs 130, 131 are in units of angular degrees, the vertical axis 162-163 of graphs 132, 133 are in units of Newtons, and the horizontal axes 170-173 are in units of Hertz (Hz).

The spectral density of the pitch position ϕ displayed by graphs 130, 131 was generated from position verses time data by a Fast Fourier Transform (FFT) using a four-second sampling window (plots 140-142) and a 600-second sampling window (plots 143-145). The pitch system in question included a servo drive having a frequency response $f_{SD}$=100 Hz that adjusted the pitch of each blade 20 based on the pitch command signal received from the wind turbine controller 52 and the pitch position signal 102. Plot 146 is an exemplary alarm threshold for the pitch position spectral density generated using the four-second sampling window.

The pitch force spectral density displayed by graphs 132, 133 was generated from force verses time data using an FFT with a four-second sampling window (plots 150-152) and a 600-second sampling window (plots 153-155) for the pitch system described above with respect to plots 130, 131. Plot 156 is an exemplary alarm threshold for the pitch force spectral density generated using the four-second sampling window.

It has been determined that relatively short sampling windows (e.g., four seconds) are generally useful for determining spectral content of position or force data for frequencies above 3 Hz, and in particular, for frequencies in the range of 3-7 Hz. In contrast, relatively long sampling windows (e.g., 600 seconds) are generally useful for determining spectral content for frequencies below 3 Hz, such as frequencies related to the rotation of the rotor 16. Frequencies corresponding to the rate the rotor 16 is rotating can be seen as amplitude peaks centered at approximately 0.25 Hz (peak 180 corresponding to the fundamental frequency or first harmonic of rotation), 0.50 Hz (peak 181 corresponding to the second harmonic of rotation), 0.75 Hz (peak 182 corresponding to the third harmonic of rotation) 1.0 Hz (peak 183 corresponding to the fourth harmonic of rotation), and 1.25 Hz (peak 184 corresponding to the fifth harmonic of rotation).

It has been further determined that energy in a spectral region 190 generally centered around 3.0 Hz is associated with vibrations of the blade edges. The frequencies produced by edge vibrations are particularly visible in the plots 150-152 of pitch force graph 132, with distinct regions 190, 192 of elevated amplitude seen at 3.0 Hz and from 4.5 Hz up to 7.0 Hz. This energy is believed to be generated by the trailing edge of the blade, and manifests itself as a relatively high amplitude in the spectral region 190 centered on 3.0 Hz and as a broad peak in the spectral region 192 beginning at about 4.5 Hz and ending at about 7.0 Hz. The relatively high spectral density in these spectral regions 190, 192 may be related to pitch actuation eigenfrequencies.

The relatively high spectral density in these spectral regions 190, 192 may also be associated with concurrence of hydraulic cylinder and blade inertia eigenfrequencies, as well as blade eigenfrequencies.

The alarm threshold levels 146, 156 may be determined empirically, i.e., by collecting data on one or more wind turbines (e.g., the specific wind turbine to be monitored) that are known to be functioning properly and which are operating under normal operating conditions. The alarm thresholds may then be set with sufficiently high limits to avoid alarms under these conditions to prevent unnecessary down time due to false alarms. In general, short sampling window data may be used for monitoring the wind turbine 10, and the long sampling window data may be used to characterize operation of the wind turbine and set alarm limits.

Figure 11:
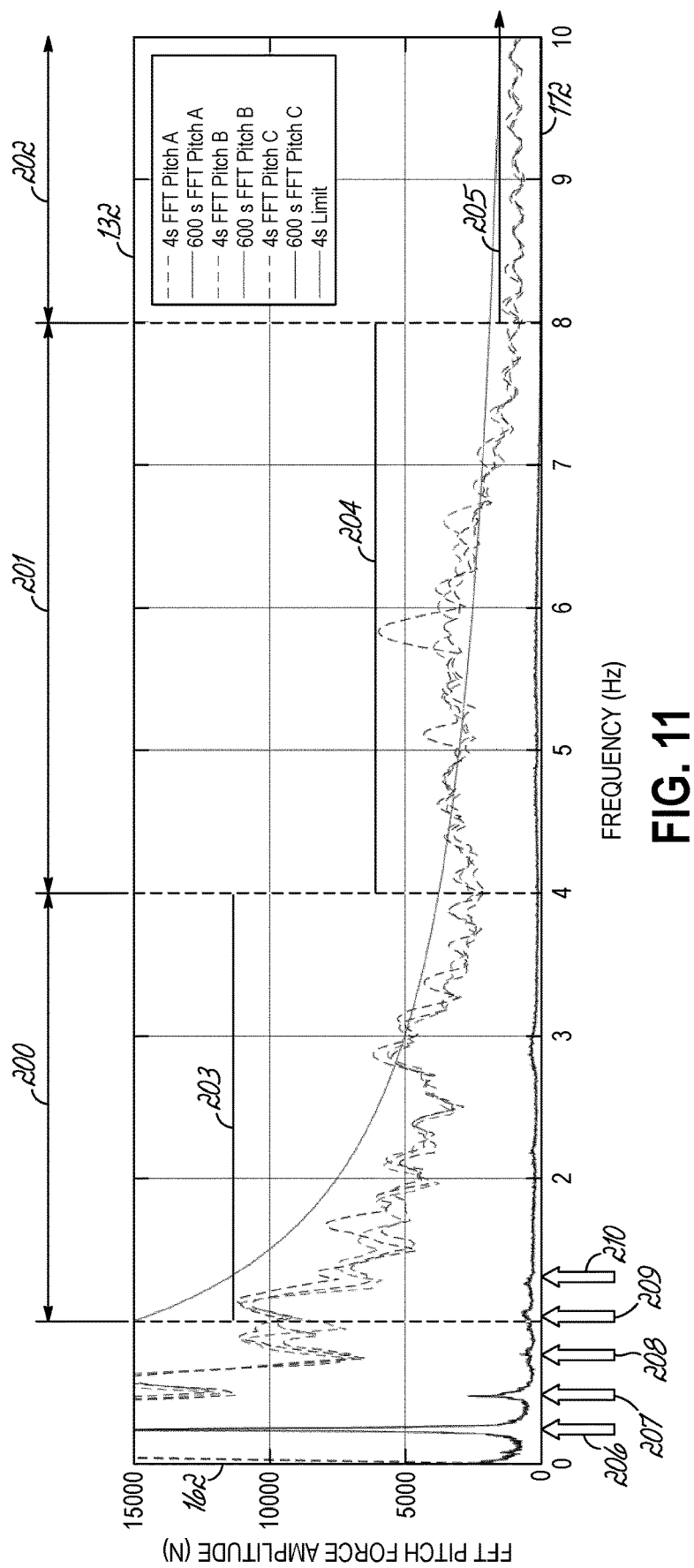
FIG. 11 is a graphical view illustrating the spectral density of signals indicative of the pitch force of FIG. 9 further depicting frequency bins and working-points that may be used to analyze the spectral density of the pitch force signal.

In an embodiment of the invention, frequency binning may be used to analyze spectral densities generated from pitch force related data. FIG. 11 illustrates graph 132 showing exemplary frequency binning for purposes of describing some binning techniques which may be used for data analysis. In the exemplary embodiment, frequency bins are defined to include a low-frequency bin 200 that covers frequencies between 1 Hz and 4 Hz, a medium frequency bin 201 that covers frequencies between 4 Hz and 8 Hz, and a high-frequency bin 202 that covers frequencies above 8 Hz. It should be understood that these frequency bins are exemplary only, and the invention is not limited to any particular size or number of frequency bins. Thus, any alternative frequency bins could be defined, e.g., one bin per Hz or even overlapping frequency bins.

In an embodiment of the invention, maximum, mean, and minimum amplitudes of the spectral density may be determined for each frequency bin. By way of example, lines 203-204 indicate the maximum values in each of bins 200-202, respectively. Maximum, mean, and minimum amplitudes may also be determined for a plurality of "working-points" 206-210 each corresponding to a harmonic of the rotation of the rotor 16. By way of example, for a rotor 16 having a time of rotation $t_R=4$ sec (i.e., one 360 degree rotation every four seconds), the frequencies of working-points 206-210 may be $f_x=x_1/t_r$, $x_2/t_r$, $x_3/t_r$, $x_4/t_r$, $x_5/t_r$, where $x_1$-$x_5$ are integers (e.g., 1, 2, 3, 4, 5). The work-points may be determined in relation to the rotor speed for each time step, so that if the angular velocity of the rotor changes, the work-points 206-210 shift in frequency.

The maximum, minimum, and mean values in each bin and of each working-point may be determined and used for triggering alarms in order to avoid bin values being dominated by averaging over time for a moving window of time, e.g., 600 seconds. The maximum, minimum, and mean values may each be compared to a respective limit, and an alarm triggered if at least one of the values exceeds (e.g., rises above or falls below) its limit.

Figure 12:
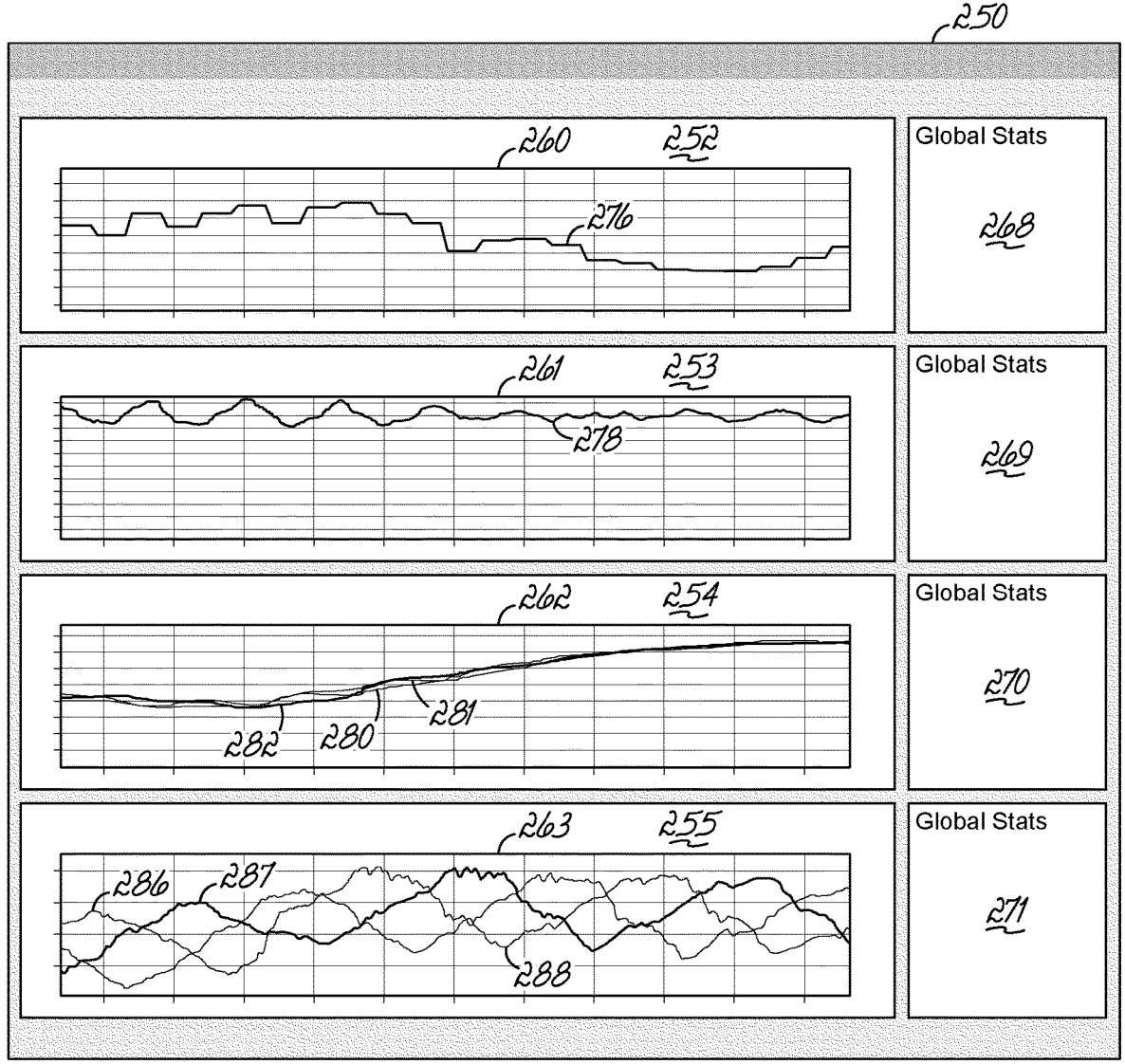
FIG. 12 is a diagrammatic view illustrating a user interface of a monitoring system that may be used to monitor the wind turbine of FIG. 1 in accordance with an embodiment of the invention.

FIG. 12 illustrates an exemplary user interface 250 that includes a plurality of windows 252-255 each displaying data relating to operation of the wind turbine 10. Each window includes a graph 260-263 showing a value verses time for a monitored parameter of the wind turbine 10, and a data box 268-271 that displays statistics values (e.g., maximum, minimum, mean, and standard deviation) relating to the data represented by the respective graph 260-263. Exemplary parameters include a wind speed graph 260 displaying a plot 276 of wind speed verses time, a power output graph 261 displaying a plot 278 of power output verses time for the wind turbine 10, a pitch position graph 262 including plots 280-282 of the pitch position ϕ verses time for each of three blades, and a pitch pressure graph 263 including plots 286-288 of a pitch pressure (e.g., front chamber pressure) verses time for each of the three blades.

The frequency-domain data illustrated in FIGS. 7-11 may be based on the time-domain data collected from sensors in the wind turbine 10 and displayed by the graphs 260-263 of user interface 250. Supervision limits may be set so that the supervision is robust with regard to false alarms. Initially, 600-second sampling window values may be used to generate baselines for the supervision values. For example, alarm limits may be set to trigger an alarm with the maximum amplitude levels of the working-points or frequency bands exceed an alarm threshold. An exemplary alarm threshold may be provided by:

$$T_{alarm} = \frac{1}{f} \times \beta \qquad \text{Eqn. 2}$$

where $T_{alarm}$ is the threshold for the measured or calculated amplitude, and β is a scaling value that depends on the parameter being monitored. Exemplary values for the scaling value may be β=125 for working-points and β=500 for frequency bands. Typically, the lowest frequency values in a frequency band will produce the highest alarm threshold, and this tendency is reflected by the 1/f factor. Alarm thresholds may be active for a period exceeding that of the longest sampling window (e.g., ≥600 seconds). In response to a monitored parameter exceeding the alarm threshold, an alarm may be detected, and supervision triggered.

For embodiments of the invention in which hydraulic actuators are used to generate pitch force $F_P$, the frequency content of hydraulic fluid pressure verses time may be used to provide information regarding system resonances and blade stability. This data can be obtained, for example, by determining the frequency content of pressure verses time data taken from a single chamber of a hydraulic cylinder. Sampling the sensor data using a sampling frequency $f_S=100$ Hz has been determined to provide sufficient resolution to enable analysis of frequencies up to at least 10 Hz. This frequency content can provide an indication of controller stability, levels of wear or fatigue of hardware components, condition of hydraulic fluid (e.g., high air content changes frequency measurement), the state of the blade, etc.

Changes in the amplitude of monitored frequencies or working-points may indicate changes in system performance and robustness of system design. For example, if the blade and pitch system each have a resonance at about the same frequency, this resonance may produce a spike in spectral density near the resonance. It has been determined that, in general, frequency characteristics are tied to certain fundamental characteristics of the wind turbine, and can therefore provide useful information about how the wind turbine is operating.

Processing to determine spectral densities can be done using a number of different methods. For example, binning may be performed using digital bandpass filters in the time-domain, or using an FFT to convert sampled signals from the time-domain to the frequency-domain. In any case, as can be seen by the difference in smoothness between four-second and 600-second sampling windows, the sampling window should be selected to maximize the utility of the resulting frequency data.

Frequency analysis of pitch force data may provide improved knowledge of components and system at low cost. In cases where the sensors are already present, the only cost may be an increase in the processing load of the controller or other computing device performing the analysis. However, much of this processing can occur during times when the processing load from operating the wind turbine is low, thereby limiting the impact on computing devices in the wind turbine. Additional parameters that may correlate with or otherwise affect the spectral content of the pitch position ϕ, pitch force $F_P$, and pressure data include the absolute direction of the wind, the bandwidth of control loops, wind speed, pitch out, and resonances in the edge of the blade.

Frequency analysis of the pressure, force, and position data provides a spectral fingerprint of the wind turbine 10 under different operating conditions. This spectral fingerprint may enable identification of problems in specific portions of the pitch system 56 (e.g., the control loop) or other components of the wind turbine 10, such as the gearbox. For example, it has been determined that vibrations occurring in the 0.5-3 Hz range are typically generated by the pitch drive system 40. Thus, changes to the frequency content in this range may be indicative of wear or failure of a component in the pitch drive system 40.

Some sources of vibrations in the blades of the wind turbine may be dependent on which sector of rotation the blade is in, as well as other operational parameters of the wind turbine. For example, a failing pitch bearing may only cause a certain vibration in the pitching system when the blade in question is passing through a certain sector of rotation due to the effect of gravity.

By configuring a sampling window to select pitch force samples collected from a blade while the blade is in one or more specified sectors of rotation, embodiments of the invention may isolate these sources of vibrations. In a preferred embodiment, the sampling window may also be adjusted based on other operating conditions so that only samples collected under conditions known to provide good data are used to determine the condition of the wind turbine. The sampling window can also be configured differently depending on the component that is being monitored in order to optimize the ability of the system to determine the condition of the component in question. For example, by selecting samples that correspond to an operating condition that produces certain vibrations in the component.

Figure 13:
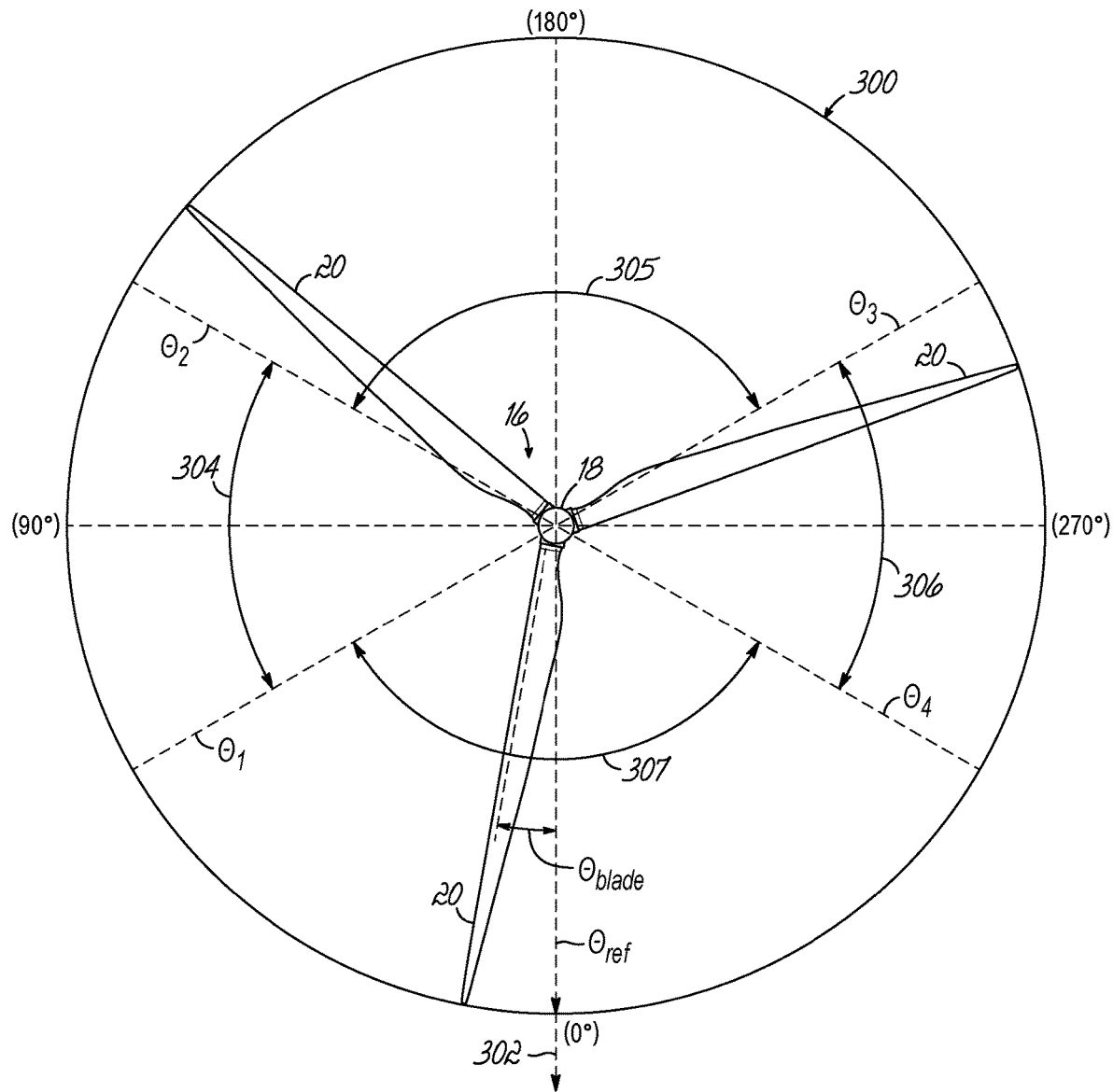
FIG. 13 is a diagrammatic view of a rotor plane comprising a plurality of sectors through which the blades of the rotor of FIG. 1 rotate.

FIG. 13 depicts a rotor plane 300 that is perpendicular to an axis of rotation of the rotor 16 and through which the blades 20 of rotor 16 rotate. The position of each blade 20 in the rotor plane 300 may be identified by an azimuth angle $\theta_{blade}$ of the blade. The azimuth angle $\theta_{blade}$ of the blade is defined relative to a reference angle $\theta_{ref}$. In the depicted embodiment, the reference angle $\theta_{ref}$ is defined by a vector 302 originating at the axis of rotation and pointing downward through the rotor plane 300, and the value of the azimuth angle $\theta_{blade}$ increases as the blade 20 moves in a clockwise direction away from the reference angle $\theta_{ref}$ as viewed from the front. However, it should be understood that both the position of the reference angle $\theta_{ref}$ and the direction of increasing value of the azimuth angle $\theta_{blade}$ is arbitrary, and any reference angle and direction of rotation can be used.

The rotor plane 300 may be divided into a plurality of sectors 304-307 (e.g., four sectors) each defined by a range of azimuth angles θ. In the depicted embodiment, the sectors 304-307 include a sector 304 with azimuth angles between $\theta_1$ and $\theta_2$ ($\theta_1 < \theta < \theta_2$), a sector 305 with azimuth angles between $\theta_2$ and $\theta_3$ ($\theta_2 < \theta < \theta_3$), a sector 306 with azimuth angles between $\theta_3$ and $\theta_4$ ($\theta_3 < \theta < \theta_4$), and a sector 307 with azimuth angles between $\theta_4$ and $\theta_1$ ($\theta_4 < \theta < \theta_1$), where $\theta_1 = 0$ degrees for sector 304 and $\theta_1 = 360$ degrees for sector 307. Although FIG. 13 depicts four sectors, it should be understood that embodiments of the invention are not limited to a specific number or size of sectors, and the rotor plane 300 may be divided into any number of sectors each having any size.

The angular position of the rotor 16 may be provided by an azimuth sensor configured to measure the azimuth angle θ of the rotor 16, or rotor azimuth angle $\theta_{rotor}$. Because the azimuth angle θ of each blade 20, or blade azimuth angle $\theta_{blade}$ is fixed relative to the rotor azimuth angle $\theta_{rotor}$, the sector each blade 20 is in at a given time can be determined based on the rotor azimuth angle $\theta_{rotor}$.

By way of example, for the above exemplary rotor plane 300, the data received from sensors in the blades may be parsed into windows each corresponding to one of the sectors 304-307 through which the blade passes during each full 360 degrees of rotation. Data corresponding to each window may then be converted from the time-domain to the frequency-domain so that that the frequency content of the signal for each sector is isolated. Different spectral fingerprints may then be applied to each sector to increase the resolution and accuracy of the monitoring process.

Origins of peaks in these spectral fingerprints may include resonant frequencies in the blades 20 or components thereof, and resonances in the blade pitch drive system, which may be dependent on the blade pitch or angular position of the rotor 16. In cases where resonances of different components or systems are aligned in frequency, they may constructively reinforce each other and thereby causes problems in operation of the wind turbine.

In order to control oscillations in the wind turbine 10, the pitch controller 70 may be configured to implement a resonance control algorithm that damps resonances in response to detecting an excessive amount of energy at a particular frequency or in a particular frequency band.

Embodiments of the system may also be used to test wind turbine models. For example, each model being tested can be used to predict spectral densities that will be produced by the wind turbine in operation. Models which accurately predict spectral densities similar to those measured may then be considered accurate models.

As described above, samples comprising a discrete time-domain signal indicative of pitch force $F_P$ may be selected for or excluded from analysis based on conditions at the time the sample was taken. For example, whether or not the sample was taken during a period of time when some parameter exceeded a threshold. This selection may be performed by generating a sampling window that selects which pitch force samples are used for analysis according to the desired conditions.

Figure 14:
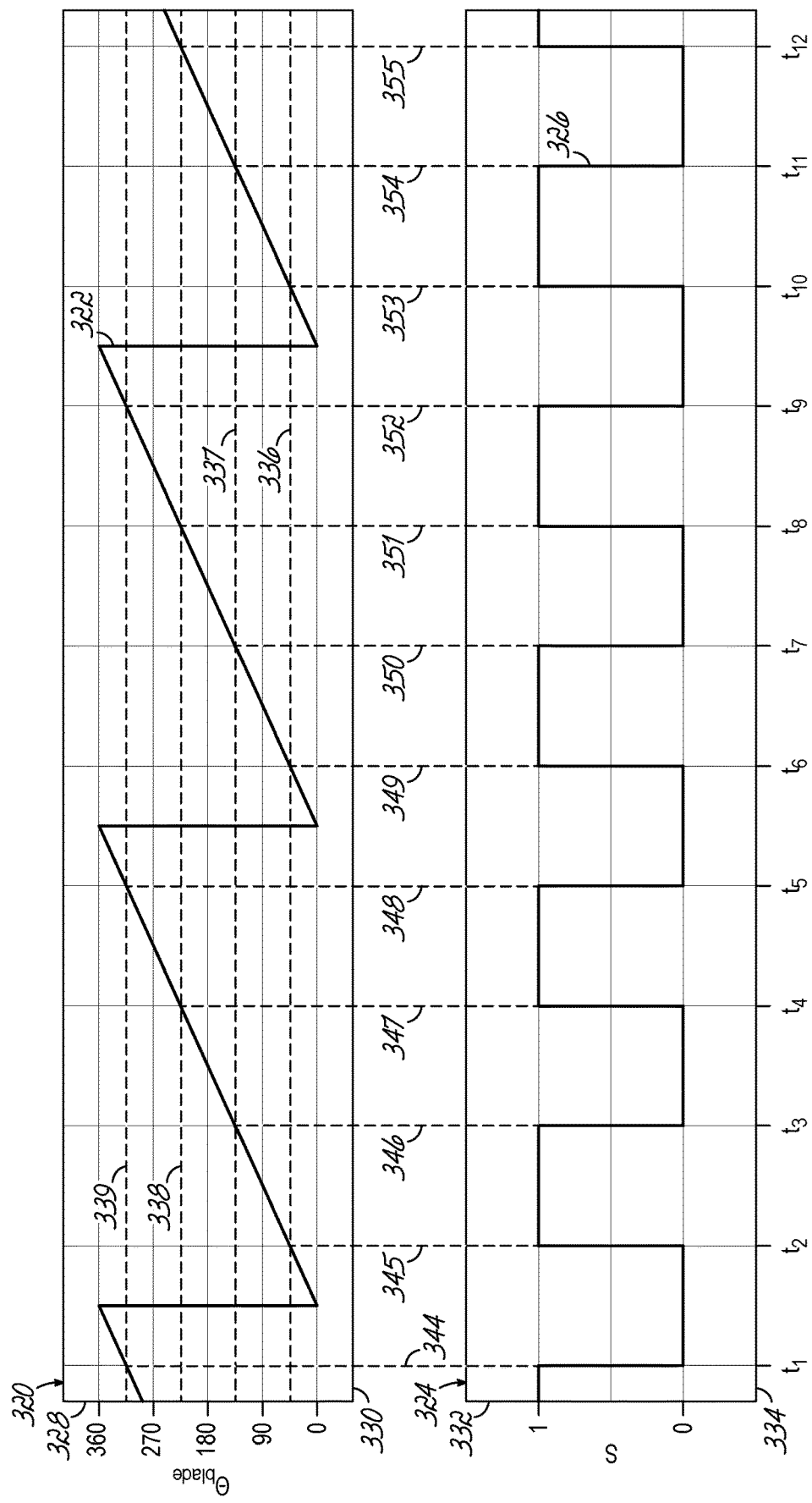
FIG. 14 is a graphical view illustrating a relationship between a blade azimuth angle in the rotor plane of FIG. 13 and a sampling window function.

FIG. 14 depicts a blade azimuth graph 320 including a plot 322 of blade azimuth angle $\theta_{blade}$ verses time, and a sampling window graph 324 including a plot 326 of a sampling window S(t). Graph 320 includes a vertical axis 328 corresponding to the blade azimuth angle $\theta_{blade}$, and a horizontal axis 330 corresponding to time. Graph 324 includes a vertical axis 332 corresponding to whether samples are selected for analysis of the discrete time-domain signal (S=1) or excluded from analysis of the discrete time-domain signal (S=0), and a horizontal axis 334 corresponding to time. The horizontal axes 330, 334 are aligned so that the sampling window plot 326 illustrates correspondence between the sampling window S(t) and blade azimuth angle $\theta_{blade}$. Graph 320 includes horizontal dashed lines 336-339 each corresponding to an azimuth angle θ threshold that defines a boundary between a sector 304-307 of the rotor plane 300 during which samples are selected for analysis and a sector 304-307 of the rotor plane 300 during which samples are excluded from analysis. Vertical dashed lines 344-355 indicate times $t_1$-$t_{12}$ when the azimuth angle θ of the blade 20 crosses (i.e., exceeds) one of these thresholds, and illustrate how this defines the sampling window S(t) as shown by sampling window plot 326.

Figure 15:
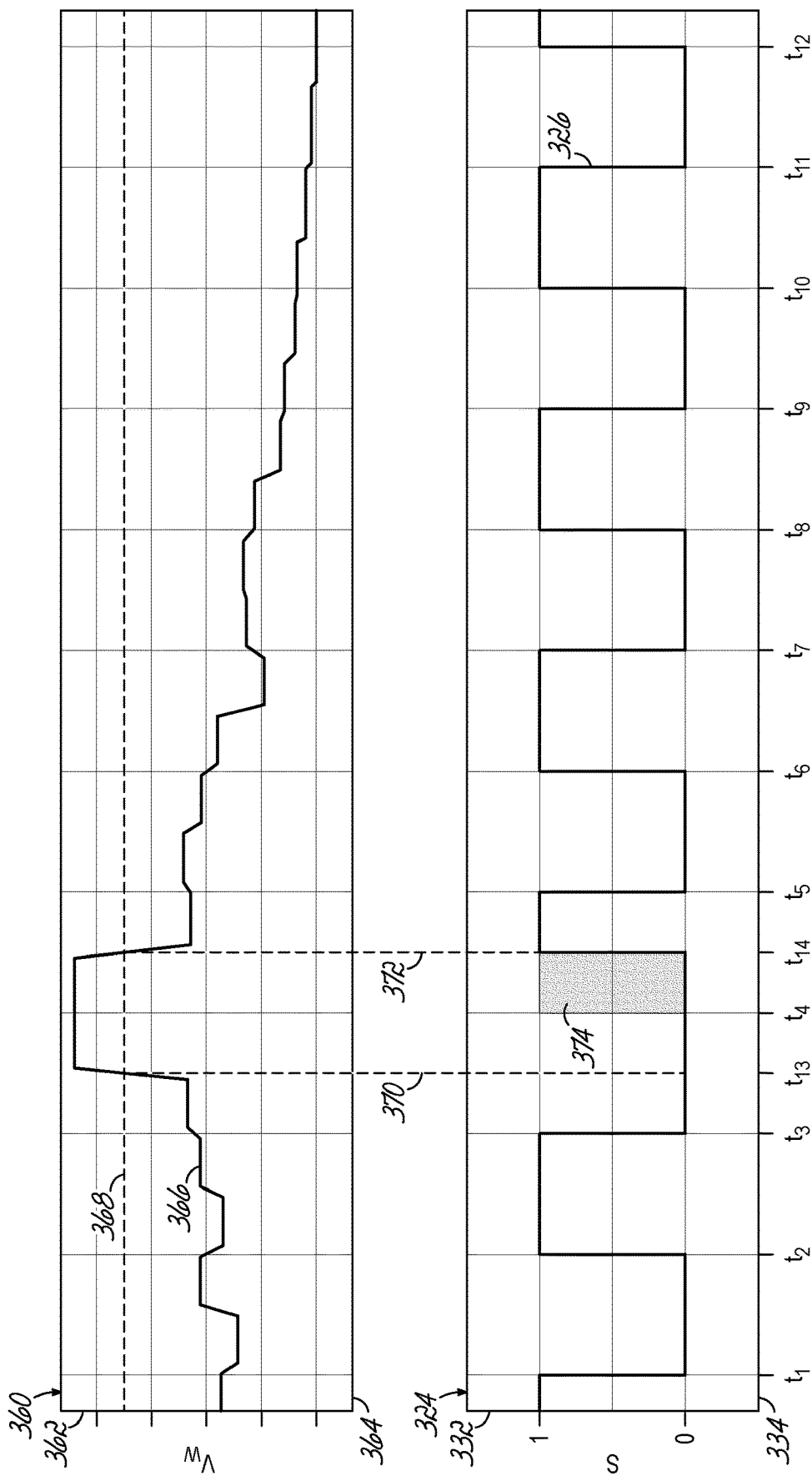
FIG. 15 is a graphical view illustrating a relationship between wind speed and the sampling window function of FIG. 14.

FIG. 15 depicts sampling window graph 324 from FIG. 14 and a wind speed graph 360. The wind speed graph 360 includes a vertical axis 362 corresponding to the wind speed $V_W$, a horizontal axis 364 corresponding to time t, and a plot 366 of wind speed $V_W$ verses time t. The horizontal axis 364 of graph 360 is aligned with the horizontal axis 334 of graph 324. A horizontal dashed line 368 indicates a wind speed threshold above which the wind speed is considered too high to provide good data. Although not shown, embodiments of the invention may also include a wind speed threshold below which the wind speed is considered too low to provide good data. In either case, when the wind speed $V_W$ exceeds a wind speed threshold, samples may be excluded from analysis by the sampling window S(t).

In the depicted example, vertical dashed lines 370, 372 indicate times $t_{13}$, $t_{14}$ at which the wind speed $V_W$ exceeds the wind speed threshold. The wind speed $V_W$ exceeds the wind speed threshold at time $t_{13}$, and falls back below the threshold at time $t_{14}$. Because at time $t_{13}$ the blade 20 is in a sector of rotation from which samples are already excluded by the sampling window S(t), the wind speed $V_W$ exceeding the wind speed threshold does not have an immediate effect on the sampling window S(t). However, as indicated by the grayed-out region 374 of the sampling window plot 326 between time $t_4$ and $t_{14}$, when the blade 20 exceeds the blade azimuth threshold corresponding to time $t_4$, because the wind speed $V_W$ is still above the wind speed threshold, the sampling window plot 326 remains at 0 until time $t_{15}$, when the wind speed $V_W$ falls below the wind speed threshold.

Figure 16:
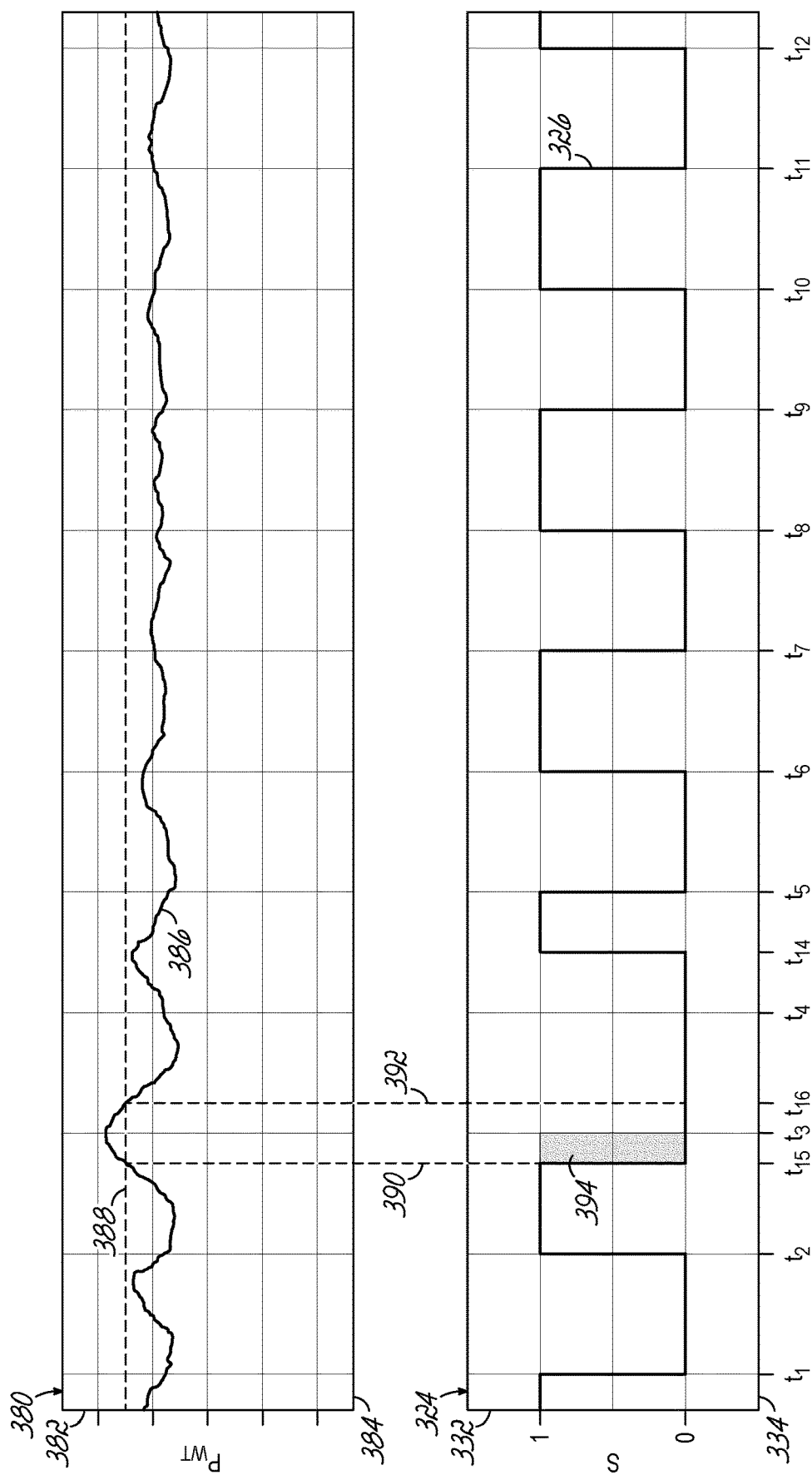
FIG. 16 is a graphical view illustrating a relationship between the power output of the wind turbine of FIG. 1 and the sampling window function of FIG. 15.

FIG. 16 depicts sampling window graph 324 from FIG. 15, and a power output graph 380. The power output graph 380 includes a vertical axis 382 corresponding to the power output $P_{wt}$ of the wind turbine 10, a horizontal axis 384 corresponding to time t, and a plot 386 of power output $P_{wt}$ verses time t. The horizontal axis 384 of graph 380 is aligned with the horizontal axis 334 of graph 324, and a horizontal dashed line 388 indicates a power output threshold above which samples are to be excluded by the sampling window S(t). Vertical dashed lines 390, 392 indicate times $t_{15}$, $t_{16}$ at which the power output of the wind turbine 10 exceeds this threshold.

In the depicted example, the power output exceeds the power output threshold at time $t_{15}$, and falls back below the threshold at time $t_{16}$. Because at time $t_{15}$ the blade 20 is in a sector of rotation from which samples are normally included in analysis of the discrete time-domain signal, the power output exceeding the power output threshold has an immediate effect on the sampling window S(t). As can be seen by the grayed-out region 394 of the sampling window plot 324 between time $t_{15}$, and $t_3$, when the power output of the wind turbine 10 exceeds the power output threshold, the sampling window S(t) is modified so that samples are excluded from analysis of the discrete time-domain signal. Because the blade 20 has exceeded the blade azimuth threshold corresponding to time $t_3$ before the power output of the wind turbine 10 drops back below the power output threshold at time $t_{16}$, the sampling window plot 326 remains at 0 until time $t_{14}$ when the blade 20 enters the next sector in which samples are to be analyzed.

Figure 17:
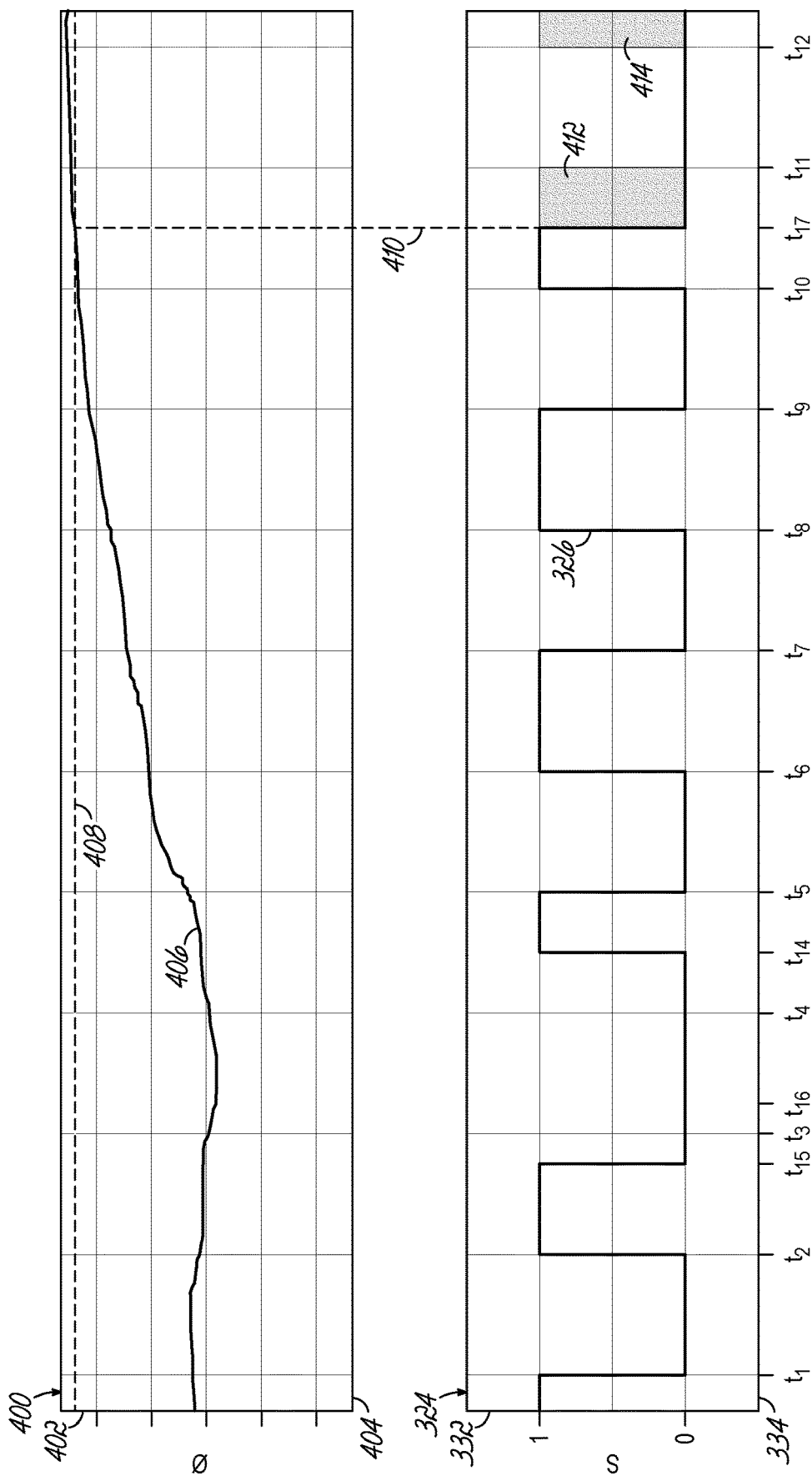
FIG. 17 is a graphical view illustrating a relationship between the pitch position of the blade of FIG. 14 and the sampling window function of FIG. 16.

FIG. 17 depicts sampling window graph 324 from FIG. 16, and a pitch position graph 400. The pitch position graph 400 includes a vertical axis 402 corresponding to the pitch position φ of the blade 20, a horizontal axis 404 corresponding to time t, and a plot 406 of pitch position φ verses time. The horizontal axis 406 of graph 400 is aligned in time with the horizontal axis 334 of graph 324, and a horizontal dashed line 408 indicates a pitch position threshold above which samples are to be excluded by the sampling window S(t). Vertical dashed line 410 indicates a time $t_{17}$ at which the pitch position φ of the blade 20 exceeds the pitch position threshold.

In the depicted example, the pitch position φ exceeds the pitch position threshold at time $t_{17}$. Because at time $t_{17}$ the blade 20 is in a sector of rotation from which samples are normally included in analysis of the discrete time-domain signal, the pitch position φ exceeding the pitch position threshold has an immediate effect on the sampling window S(t). As can be seen by the grayed out region 412 of the sampling window plot 324 between time $t_{17}$ and $t_{11}$, and the grayed-out region 414 after $t_{12}$, when the pitch position φ of the blade 20 exceeds the pitch position threshold, the sampling window S(t) is modified so that samples are excluded from analysis of the discrete time-domain signal.

Figure 18:
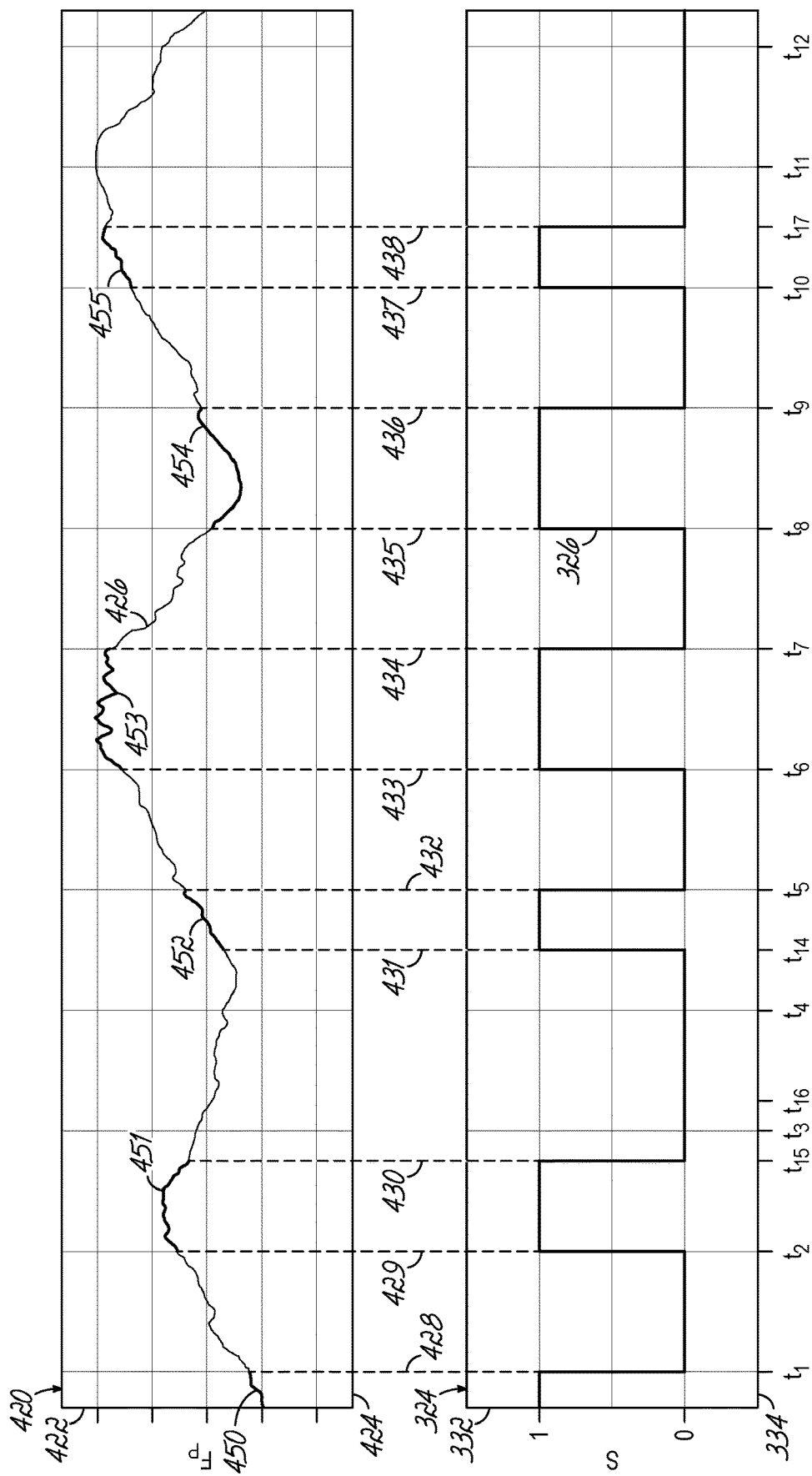
FIG. 18 is a graphical view illustrating a relationship between the pitch force signal and the sampling window function of FIG. 17.

FIG. 18 depicts the sampling window graph 324 from FIGS. 14-17 and a pitch force graph 420. The pitch force graph 420 includes a vertical axis 422 corresponding to the pitch force $F_P$ being applied to the blade 20, a horizontal axis 424 corresponding to time t, and a plot 426 of pitch force $F_P$ verses time. The horizontal axis 424 of graph 400 is aligned with the horizontal axis 334 of graph 324, and vertical dashed lines 428-438 indicate times at which the sampling window plot 326 changes value between "1" (select sample) and "0" (exclude sample).

The sampling window S(t) represented by plot 326 shows that samples selected for analysis include those prior to $t_1$, between time $t_2$ and time $t_{15}$, between time $t_{14}$ and time $t_5$, between time $t_e$ and time $t_7$, between time $t_8$ and time $t_9$, and between time $t_{10}$ and time $t_{17}$. Portions of the pitch force signal represented by plot 426 that fall within portions of the sampling window S(t) in which samples are selected for analysis are shown as bold segments 450-455. These segments 450-455 correspond to periods of time when all the selection parameters are met such that the value of the sampling window S(t) is "1".

The sample window function S(t) may be implemented as a logical "AND" function with inputs from a plurality of logic conditions each defining a sampling window. For the embodiments described above, $S(t)=S_\theta(t) \times S_V(t) \times S_P(t) \times S\theta(t)$, where the blade azimuth sampling window $S_\theta(t)=0$ when the blade azimuth angle $\theta_{blade}$ exceeds a blade azimuth threshold, and Se(t)=1 when the blade azimuth angle $\theta_{blade}$ is within the blade azimuth threshold. Likewise, the wind speed sampling window $S_V(t)=0$ when the wind speed $V_W$ exceeds a wind speed threshold, and $S_V(t)=1$ when the wind speed $V_W$ is within the wind speed threshold. The power output sampling window $S_P(t)=0$ when the power output $P_{wt}$ of the wind turbine 10 exceeds a power output threshold, and $S_P(t)=1$ when the power output $P_{wt}$ of the wind turbine 10 is within the power output threshold. The pitch position sampling window $S_\phi(t)=0$ when the pitch position φ of the blade 20 exceeds a pitch position threshold, and $S_\phi(t)=1$ when the pitch position φ of the blade 20 is within the pitch position threshold.

It should be understood that other embodiments could use different combinations of operational parameters to generate sampling windows. Moreover, in addition to the value of a parameter, the rate of change of the value of the parameter, or the value of the parameter integrated over a time interval may also be used to generate sampling windows. Thus, the invention is not limited to sampling windows based on any particular type or combination of operational parameters, or to sampling windows based on any particular type or combinations of functions applied to the operational parameters.

Figure 19:
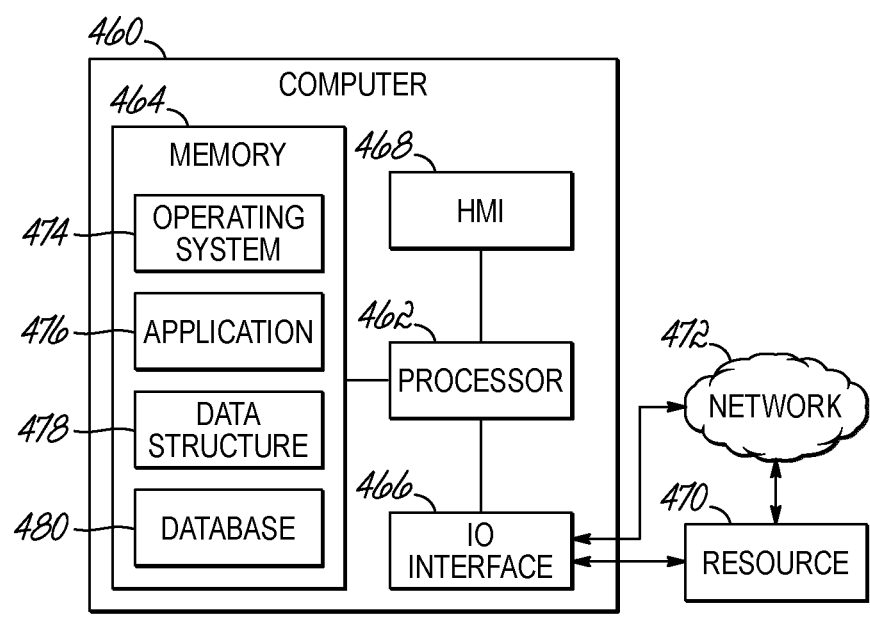
FIG. 19 is a diagrammatic view of a computer that may be used to implement one or more of the components or processes shown in FIGS. 1-18.

Referring now to FIG. 19, embodiments of the invention described above, or portions thereof, may be implemented using one or more computer devices or systems, such as exemplary computer 460. The computer 460 may include a processor 462, a memory 464, an input/output (1/O) interface 466, and a Human Machine Interface (HMI) 468. The computer 460 may also be operatively coupled to one or more external resources 470 via the network 472 or I/O interface 466. External resources may include, but are not limited to, servers, databases, mass storage devices, peripheral devices, cloud-based network services, or any other resource that may be used by the computer 460.

The processor 462 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 464. Memory 464 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 462 may operate under the control of an operating system 474 that resides in memory 464. The operating system 474 may manage computer resources so that computer program code embodied as one or more computer software applications, such as an application 476 residing in memory 464, may have instructions executed by the processor 462.

The I/O interface 466 may provide a machine interface that operatively couples the processor 462 to other devices and systems, such as the external resource 470 or the network 472. The application 476 may also have program code that is executed by one or more external resources 470, or otherwise rely on functions or signals provided by other system or network components external to the computer 460.

A database 480 may reside in memory 464 and may be used to collect and organize data used by the various systems and modules described herein. The database 480 may include data and supporting data structures that store and organize the data.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

While all the invention has been illustrated by a description of various embodiments, and while these embodiments have been described in considerable detail, it is not the intention of the Applicant to restrict or in any way limit the scope of the appended claims to such detail.

Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A system for monitoring operation of a wind turbine including a rotor having a blade and rotates in a rotor plane having a plurality of sectors, the system comprising:
    one or more processors; and
    a memory coupled to the one or more processors and including program code that, when executed by the one or more processors, causes the system to:
    receive a time-domain signal indicative of a pitch force being applied to the blade;
    determine a first spectral density of the time-domain signal by sampling the time-domain signal to generate a discrete time-domain signal, selecting a plurality of samples from the discrete time-domain signal that are within a sampling window corresponding to a first period of time when the blade is in a selected sector of the plurality of sectors, and transforming the plurality of samples from a time-domain to a frequency-domain;
    determine a condition of the wind turbine based on a frequency content of the first spectral density; and
    in response to the condition being indicative of a problem with the wind turbine, generate an alarm signal.

2. The system according to claim 1, wherein the time-domain signal is indicative of a pressure of a fluid in a chamber of a hydraulic actuator of a pitch drive that controls a pitch of the blade.

3. The system according to claim 1, wherein the plurality of samples is selected so that each sample of the plurality of samples corresponds to a wind speed that is within a predetermined wind speed range or a rate of change in the wind speed that is within a predetermined rate of change in wind speed range.

4. The system according to claim 1, wherein the samples are selected so that each sample of the plurality of samples corresponds to a pitch position that is within a predetermined pitch position range or a rate of change in the pitch position that is within a predetermined rate of change in pitch position range.

5. The system according to claim 1, wherein the samples are selected so that each sample of the plurality of samples corresponds a power output of the wind turbine that is within a predetermined power output range or a rate of change in the power output of the wind turbine that is within a predetermined rate of change in power output range.

6. The system according to claim 1, wherein the samples are selected so that each sample of the plurality of samples corresponds to a load on the blade that is within a predetermined load range.

7. The system according to claim 1, wherein the program code causes the system to determine the condition of the wind turbine based on the frequency content of the first spectral density by:
comparing the first spectral density to a second spectral density determined for the wind turbine during a second period of time when the wind turbine is known to have been operating normally.

8. The system according to claim 1, wherein the program code causes the system to determine the condition of the wind turbine based on the first spectral density by:
defining at least one frequency bin covering a portion of the first spectral density;
determining one or more of a maximum amplitude, a mean amplitude, and a minimum amplitude of the portion of the first spectral density covered by the at least one frequency bin;
comparing the one or more of the maximum amplitude, the mean amplitude, and the minimum amplitude of the portion of the first spectral density to a respective alarm threshold; and
triggering an alarm if the one or more of the maximum amplitude, the mean amplitude, and the minimum amplitude exceeds its respective alarm threshold.

9. The system according to claim 8, wherein the at least one frequency bin is one of a plurality of frequency bins each covering a different portion of the first spectral density, and the determining, comparing, and triggering steps are performed for each of the plurality of frequency bins.

10. The system according to claim 1, wherein the program code causes the system to determine the condition of the wind turbine based on the first spectral density by:
defining at least one working-point having a frequency corresponding to a harmonic of a rotation of the rotor;
determining one or more of a maximum amplitude, a mean amplitude, and a minimum amplitude for the at least one working-point;
comparing the one or more of the maximum amplitude, the mean amplitude, and the minimum amplitude for the at least one working-point to a respective alarm threshold; and
triggering an alarm if the one or more of the maximum amplitude, the mean amplitude, and the minimum amplitude of the at least one working-point exceeds the alarm threshold.

11. The system according to claim 10, wherein the at least one working-point is one of a plurality of working-points each corresponding to a different harmonic of the rotation of the rotor, and the determining, comparing, and triggering steps are performed for each of the plurality of working-points.

12. The system according to claim 1, wherein the program code further causes the system to:
in response to the first spectral density including a frequency component having an amplitude above a resonance threshold, activate a resonance control algorithm that dampens resonances corresponding to the frequency component.

13. A system for monitoring operation of a wind turbine including a rotor having a blade and that rotates in a rotor plane having a plurality of sectors, the system comprising:
one or more processors; and
a memory coupled to the one or more processors and including program code that, when executed by the one or more processors, causes the system to:
receive a time-domain signal indicative of a pitch force being applied to the blade;
determine a first spectral density of the time-domain signal by sampling the time-domain signal to generate a discrete time-domain signal, selecting a plurality of samples from the discrete time-domain signal that are within a sampling window, and transforming the plurality of samples from a time-domain to a frequency-domain;
determine a condition of the wind turbine based on a frequency content of the first spectral density; and
in response to the condition being indicative of a problem with the wind turbine, generate an alarm signal,
wherein the sampling window is selected from:
a first sampling window corresponding to a wind speed that is within a predetermined wind speed range or a rate of change in the wind speed that is within a predetermined rate of change in wind speed range;
a second sampling window corresponding to a pitch position that is within a predetermined pitch position range or a rate of change in the pitch position that is within a predetermined rate of change in pitch position range; and
a third sampling window corresponding to a power output of the wind turbine that is within a predetermined power output range or a rate of change in the power output of the wind turbine that is within a predetermined rate of change in power output range.

14. A method for monitoring operation of a wind turbine including a rotor having a blade and that rotates in a rotor plane having a plurality of sectors, the method comprising:
receiving a time-domain signal indicative of a pitch force being applied to the blade;
determining a first spectral density of the time-domain signal by sampling the time-domain signal to generate a discrete time-domain signal, selecting a plurality of samples from the discrete time-domain signal that are within a sampling window corresponding to a first period of time when the blade is in a selected sector of the plurality of sectors, and transforming the plurality of samples from a time-domain to a frequency-domain;
determining a condition of the wind turbine based on a frequency content of the first spectral density; and
in response to the condition being indicative of a problem with the wind turbine, generating an alarm signal.

* * * * *